United States Patent [19]

Kurahayashi et al.

[11] Patent Number: 4,845,569
[45] Date of Patent: Jul. 4, 1989

[54] IMAGE TRANSMISSION OR ENCODING APPARATUS

[75] Inventors: Sadasuke Kurahayashi, Niiza; Masahiro Sakamoto, Tokyo; Masatomo Takahashi, Tokyo; Motoaki Yoshino, Yasuhide Ueno, Tsunehiro Watanabe, Tsuneo Negi, Takeshi Ono, Shigeo Miura, All of Tokyo Japan

[73] Assignee: Canon Kabushiki Kaisha, Tokyo, Japan

[21] Appl. No.: 243,231

[22] Filed: Sep. 7, 1988

Related U.S. Application Data

[63] Continuation of Ser. No. 823,075, Jan. 27, 1986, abandoned.

[30] Foreign Application Priority Data

| Jan. 31, 1985 | [JP] | Japan | 60-017017 |
| Jan. 31, 1985 | [JP] | Japan | 60-017018 |
| Jan. 31, 1985 | [JP] | Japan | 60-017019 |
| Jan. 31, 1985 | [JP] | Japan | 60-017020 |
| Jan. 31, 1985 | [JP] | Japan | 60-017024 |
| Jan. 31, 1985 | [JP] | Japan | 60-017025 |
| Jan. 31, 1985 | [JP] | Japan | 60-017027 |

[51] Int. Cl.$^4$ ............................................. H04N 1/32
[52] U.S. Cl. .................................... 358/400; 358/257; 358/261
[58] Field of Search ......................... 358/256, 257, 261

[56] References Cited

U.S. PATENT DOCUMENTS

| 4,028,731 | 6/1977 | Arps et al. | 358/260 |
| 4,204,232 | 5/1980 | Mizuno | 258/260 |
| 4,301,479 | 11/1981 | Fukinuki | 358/257 |
| 4,317,136 | 2/1982 | Keyt et al. | 358/257 |
| 4,542,413 | 9/1985 | Rallapalli et al. | 358/261.4 |
| 4,558,371 | 12/1985 | Rallapalli et al. | 358/261 |
| 4,586,088 | 4/1986 | Kondo | 358/257 |
| 4,607,299 | 8/1986 | Kurokawa | 358/257 |
| 4,672,459 | 6/1987 | Kudo | 358/257 |
| 4,675,742 | 6/1987 | Ogata | 358/257 |

FOREIGN PATENT DOCUMENTS 2131250 6/1984 United Kingdom .
2175169 11/1986 United Kingdom .

Primary Examiner—Edward L. Coles, Sr.
Attorney, Agent, or Firm—Fitzpatrick, Cella, Harper & Scinto

[57] ABSTRACT

An image transmission apparatus including a storage unit for storing an image signal; a conversion unit for converting the number of dots of one line image signal in the storage unit; and a transmission unit for selectively transmitting the output of the conversion unit or an image signal in the storage unit.

32 Claims, 29 Drawing Sheets

FIG. 2B
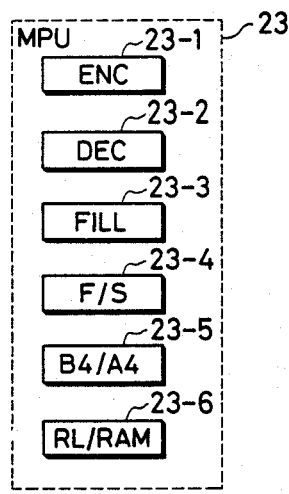
FIG. 3A
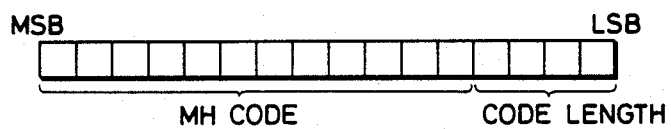
FIG. 4
FIG. 5

FIG. 7

| ADDRESS OF POINTER (HEXADECIMAL) | | DATA (HEXADECIMAL) | MH CODE (BINARY) | RUN-LENGTH (DECIMAL) |
|---|---|---|---|---|
| FIRST BIT 0 | 4000 | 4008 | | |
| | 4002 | 4004 | | |
| | 4004 | 8H03 | B1 | 3 |
| | 4006 | 8H02 | B11 | 2 |
| SECOND BIT 0 | 4008 | 4010 | | |
| | 400A | 400C | | |
| | 400C | 8H01 | B010 | 1 |
| | 400E | 8H04 | B011 | 4 |
| THIRD BIT 0 | 4010 | 4018 | | |
| | 4012 | 4014 | | |
| | 4014 | 8H06 | B0010 | 6 |
| | 4016 | 8H05 | B0011 | 5 |
| FOURTH BIT 0 | 4018 | 4024 | | |
| | 401A | 401C | | |
| | 401C | 4020 | | |
| | 401E | 8H07 | B00011 | 7 |
| | 4020 | 8H09 | B000100 | 9 |
| | 4022 | 8H08 | B000101 | 8 |
| FIFTH BIT 1 | 4024 | 407C | | |
| | 4026 | 4028 | | |
| SIXTH BIT 1 | 4028 | 4078 | | |
| | 402A | 402C | | |
| SEVENTH BIT 1 | 402C | 4030 | | |
| | 402E | 8H0C | B0000111 | 12 |
| | 4030 | 405C | | |
| | 4032 | 4034 | | |

FIG. 8A

| ADDRESS POINTER (HEXADECIMAL) | | DATA (HEXADECIMAL) | |
|---|---|---|---|
| FIRST BIT 0 | 3000 | 3004 | |
| | 3002 | 8H | (ADDRESS OF SUBROUTINE V(0)) |
| | 3004 | 300C | |
| SECOND BIT 0 | 3006 | 3008 | |
| | 3008 | 8H | (ADDRESS OF SUBROUTINE V$_L$(1)) |
| | 300A | 8H | (ADDRESS OF SUBROUTINE V$_R$(1)) |
| | 300C | 3010 | |
| THIRD BIT 0 | 300E | 8H | (ADDRESS OF SUBROUTINE H) |
| | 3010 | 3014 | |
| FOURTH BIT 0 | 3012 | 8H | (ADDRESS OF SUBROUTINE P) |
| FIFTH BIT 1 | 3014 | 301C | |
| | 3016 | 3018 | |
| | 3018 | 8H | (ADDRESS OF SUBROUTINE V$_L$(2)) |
| SIXTH BIT 1 | 301A | 8H | (ADDRESS OF SUBROUTINE V$_R$(2)) |
| | 301C | 3026 | |
| | 301E | 3020 | |
| | 3020 | 8H | (ADDRESS OF SUBROUTINE V$_L$(3)) |
| | 3022 | 8H | (ADDRESS OF SUBROUTINE V$_R$(3)) |
| | 3024 | 3028 | |
| | -------- | -------- | |

IMAGE TRANSMISSION OR ENCODING APPARATUS

This application is a continuation of application Ser. No. 823,075 filed Jan. 27,1986, now abandoned.

BACKGROUND OF THE INVENTION

1. Field of the Invention

The present invention relates to an image transmission apparatus for transmitting an image signal and more particularly, to an image transmission apparatus provided with storage means for storing the image signal. The present invention relates also to an image encoding apparatus for transmitting or storing an image.

2. Description of the Prior Art

Of the image transmission apparatus of this type, there is known a facsimile apparatus provided with an image memory.

In the case that the same image data is to be sent to various destinations, or no connection is attained even if transmission to a certain destination is desired, use of the image memory is very advantageous since the image of an original can be stored in the image memory.

However, if the main scan record size or the main scan record density of the destination machine is different from that of the sender machine, e.g., if data of B4 size is stored at the sender and the partner has only record paper of A4 size, then the transmitted image is recorded as partially broken at both ends or one end portion of the record paper, or in some cases it is entirely impossible to communicate.

Also in the case of a different record scan line density, a transmitted image is recorded with an expanded or compressed dimension in the sub-scan direction.

In a facsimile apparatus, the time required for one line recording is decided at the partner machine. Therefore, if a large amount of image data is transmitted at a relatively high speed from the sender, the partner cannot follow such recording. With a definite minimum transfer time for one line image data, it is necessary for the sender to add fill bits as a dummy code to meet the minimum transfer time if one line image data can be transmitted in less than the minimum transfer time.

Storage of such fill bits in an image memory, which bits do not contribute to an image, causes an ineffective usage of the memory capacity. The minimum transfer time varies with the type of the partner machine, so that if fill bits necessary for the longest minimum transfer time are inserted, the amount of image data to be stored in the image memory decreases.

In the facsimile apparatus of this type, a raw image signal read out is temporarily stored in a buffer memory, and the raw image signal in the memory is sequentially encoded if necessary, or the raw image signal is directly transferred if encoding is not necessary. However, if encoding to such as MH code or MR code is performed by means of software, it takes considerable time to encode from the raw image signal.

Of compression-encoding methods for the facsimile apparatus, there are one-dimensional compression such as MH encoding and two-dimensional compression such as MR encoding. The degree of compression is higher in two-dimentional compression than in one-dimensional compression. However, in two-dimensional compression, once an error occurs on one line, then the next line is adversely affected. Specifically, it becomes difficult to read a small character. In recent facsimile apparatus, information regarding the sender and transmission time is transmitted, together with image information, from the sender machine to the receiver machine to confirm at the receiver the sender and transmission time.

Such information is preferably smaller in its printed size than the characters of an original in view of space necessary for such information. However, when an error occurs during transmission in MR code, it becomes impossible to read information printed in a small size.

Conventionally, MR codes have been generated by directly encoding a row image signal. Thus, it becomes complicated to detect, from the raw image signal, inversion of white/black and it takes a long time in encoding.

Conventionally, to store a variable length code and its code length data, it is necessary to prepare a specific number of bits, obtained by addition of the maximum number of bits of the variable length code and the number of bits of code length data necessary for indicating the maximum number of bits.

For instance, the code length of MH code used in facsimile communication is 13 bits at the maximum. The number of bits necessary for indicating the code length is 4 bits, thus necessitating the total of 17 bits.

Therefore, if a 16 bit computer or memory is used, the computer must access the memory twice for encoding or decoding. In addition, as an address of the memory, two addresses are necessary for one code, thus resulting in substantial waste in operation time.

SUMMARY OF THE INVENTION

It is an object of the present invention to provide an image transmission apparatus solving the above problems, or an image encoding method and apparatus capable of effecting an efficient encoding.

It is another object of the present invention to provide an image transmission apparatus wherein image data stored in storage means with a predetermined readout density is density-converted and transmitted in accordance with the reproduction density at a partner machine.

It is a further object of the present invention to provide an image transmission apparatus capable of converting the number of dots of one line image signal in storage means in accordance with the partner machine and transmitting it.

It is a still further object of the present invention to provide an image transmission apparatus capable of a high speed conversion processing, by converting the number of dots of one line in the form of encoded state.

It is another object of the present invention to provide an image transmission apparatus converting the scan line density of an image signal in storage means in accordance with the partner machine.

It is a further object of the present invention to provide an image transmission apparatus capable of converting the scan line density at a high speed.

It is a still further object of the present invention to provide an image transmission apparatus capable of storing in storage means only effective image data.

It is another object of the present invention to provide an image transmission apparatus capable of high speed encoding and effective usage of storage means, by temporarily storing an image signal in a suitable signal form for an image transmission mode.

It is a further object of the present invention to provide an image transmission apparatus wherein information regarding the sender and transmission time is transmitted as one-dimensional encoding data to enable the recipient to read such information.

It is a still further object of the present invention to provide an encoding method capable of obtaining a two-dimensional compression code at a high speed.

It is another object of the present invention to provide a variable length code storing method capable of allocating a variable length code and its bit length within a specific number of bits.

BRIEF DESCRIPTION OF THE DRAWINGS

The above and other objects of the present invention will become apparent from the following detailed description with reference to the accompanying drawings, in which:

FIG. 2B shows a fundamental function of MPU 23 shown in FIG. 2A;

FIG. 3A shows a format of MH code in ROM 11 shown in FIG. 2A;

FIGS. 4 and 5 show formats of EOL in RAM 9;

FIG. 7 shows a search example in converting MH code into RL code;

FIG. 8A shows a search example in converting MR code into RL code;

DESCRIPTION OF THE PREFERRED EMBODIMENTS

An example of a facsimile apparatus embodying the present invention will now be described.

Mechanical Construction

Figure 1:
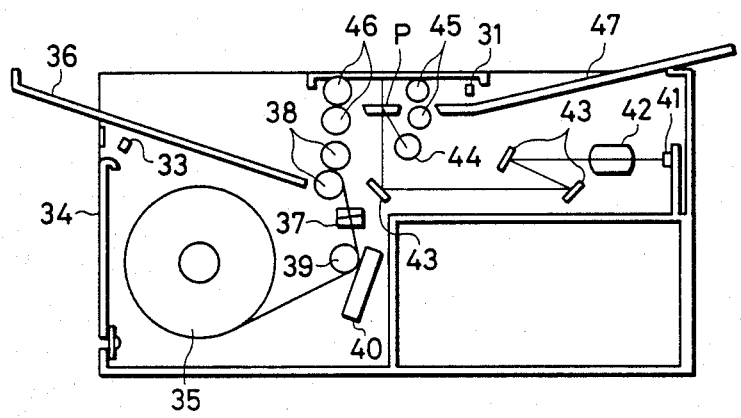
FIG. 1 is a sectional view of a facsimile apparatus showing an embodiment of the present invention.

Referring now to FIG. 1 showing a sectional view of the facsimile apparatus, reference numeral 41 denotes a CCD solid line image sensor, numeral 42 stands for a focussing lens, 43 for mirrors, 44 for an original illuminating lamp, 45 for original feed rollers, 46 for original pickup rollers, and 47 for an original feed tray. Reference numeral 31 denotes an original detection sensor for detecting if an original is present on the original feed tray.

Reference numeral 34 denotes a roll paper housing cover, numeral 35 stands for roll paper, 36 for a pickup tray for an original and record paper, 37 for a cutter, 38 for roll paper pickup rollers, 39 for roll paper transportation rollers, 40 for a recording head, and 33 for a roll paper cover sensor for detecting the open/close state of the cover 34.

In reading an original and referring to FIG. 1, an original on the original feed tray is transported by means of the rollers 45 and 46. The original is applied with light from the lamp 44 at a read-out position P. The reflected light therefrom is focussed onto the image sensor 41 via the mirrors 43 and the lens 42. The image sensor 41 converts the image into electrical signals.

Conversely in recording, a roll paper 35 is transported while squeezed between the roller 39 and the head 40 whereat the thermal roll paper 35 is formed with the image by means of the head 40. After recording one page, the roll paper 35 is cut with the cutter 37 and transported and picked up on the pickup tray 36 by means of the rollers 38.

Basic Block Diagram

Figure 2A:
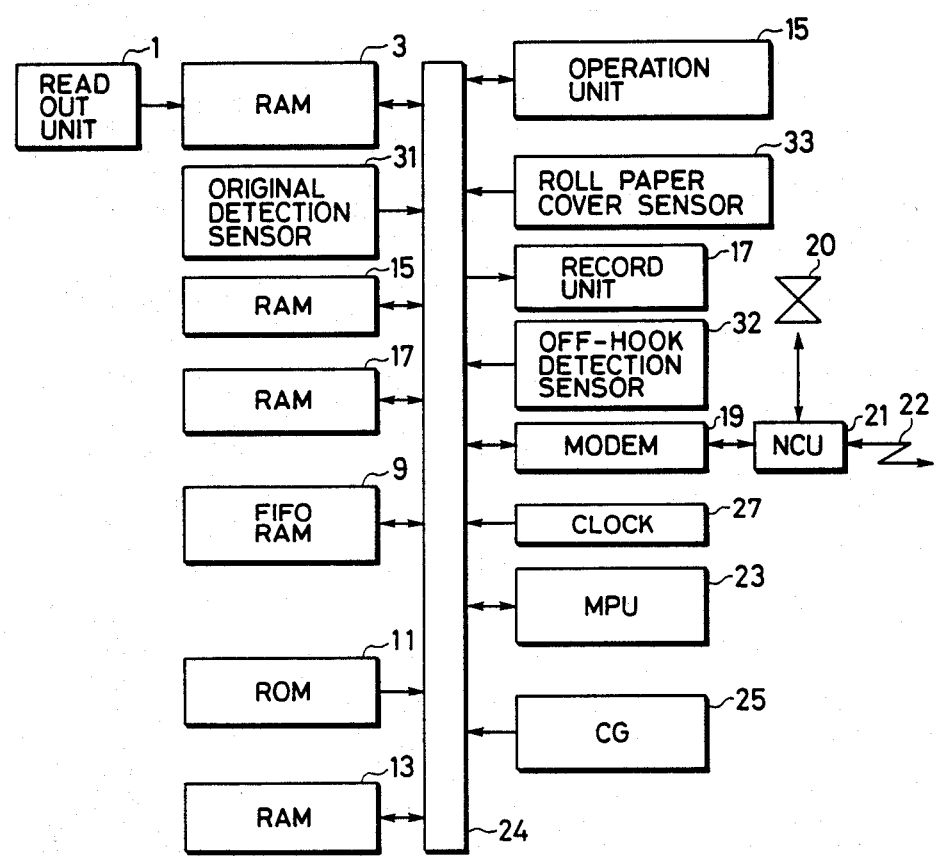
FIG. 2A is a fundamental block diagram for control of the facsimile apparatus of the embodiment.

FIG. 2A is a basic block diagram for control of the facsimile apparatus of the present embodiment. In the figure, a read-out unit 1 reads out an original image and converts it into electrical image signals. Random access memories 3, 5 and 7 (hereinafter abbreviated as RAM) function to temporarily store such as image signals. A first-in and first-out RAM 9 (hereinafter abbreviated as FIFO RAM) functions to serve as an image memory for storing image signals of several pages. A read-only memory 11 (hereinafter as ROM) stores operation programs of MPU 23. RAM 13 stores flags, data and so on necessary for operation of MPU 23. An operation unit 15 includes input keys, displays and so on. A record unit 17 records on a thermal paper a copy image, received image and management data. A modem 19 modulates transmitting data and demodulates received data. A network control unit 21 (hereinafter as NCU) controls to connect a communication line 22 either to the modem 19 or to a telephone 20. A character generator 25 (hereinafter as CG) is used for transmitting, together with image data of an original, the sender and transmission time and for storing character fonts for recording communication management data. MPU 23 controls the whole system of the apparatus. In this embodiment, a microprocessor 8086 manufactured by Intel Corp. is used which can make direct access to a 16 bit data bus 24 and a memory space up to the maximum 4 Megabytes.

The merit in using this type of MPU is an easy handling of encoded image data due to the presence of a 16 bit data bus. For instance, if 2048 bit data is to be processed by a run-length (hereinafter abbreviated as RL) code, 12 bit data is required. In this case, although two accesses are needed using an 8 bit MPU, only one access suffices using a 16 bit MPU.

Furthermore, since a memory space of a large capacity can directly be accessed, it is possible to provide a broadcast function by using the system memory as an image memory. In a conventional system, the broadcast function of an image memory has been achieved by using an external memory or an internal memory not directly accessible by MPU via a bus, thus resulting in a problem of complicated circuitries and bulky apparatus.

Function of MPU

MPU 23 has six fundamental functions shown in FIG. 2B. Each of the functions will now be explained hereinbelow.

Encoding Function (Conversion of RL into MH, MR, and other codes)

(a) Conversion of RL into MH code

In encoding, first, a one line read-out instruction is fed to the read-out unit 1. Then, the read-out unit 1 converts the read-out one line image data into RL code to write it in RAM 3. MPU 23 reads RL code out of RAM 3 to look up a code conversion table in ROM 11 using the read-out RL code and convert it into MH code. The conversion table is mapped into ROM 11 wherein MH code data corresponding to the run-length is written at the address identified by RL code. The format of MH code data is shown in FIG. 3.

In FIG. 3A, MH code is located at the upper 12 bits from MSB. Sine MH code is a variable length code, code length information of MH code is located at the lower 4 bits to identify the code length. The MH code conversion table includes 13 bit code at the maximum although MH code is allocated at the upper 12 bits. In this respect, it is to be noted that all of the codes having a 13 bit code length are appended with "0" at the head (MSB) thereof. 12 bits except the head bit "0" in the conversion table data are used as MH code, and information on the data length "13" is added thereto. In particular, by looking up the conversion table, if the data length is "13", then MPU 23 adds "0" to the head of the code.

As all MH codes and their code lengths are properly allocated in 16 bit length, an easy processing by a 16 bit MPU and a high speed access to MH code are possible.

(b) Conversion of RL into MR code

Conversion into MR code is effected by MPU 23 with reference to a basic flow described in T4 Recommendation of CCITT. In this basic flow, the most frequently used and important item is "detection of inversion of pixel black/white". To facilitate such detection, the read-out unit 1 encodes data to be written in RAM 3 into RL code.

Figure 3B:
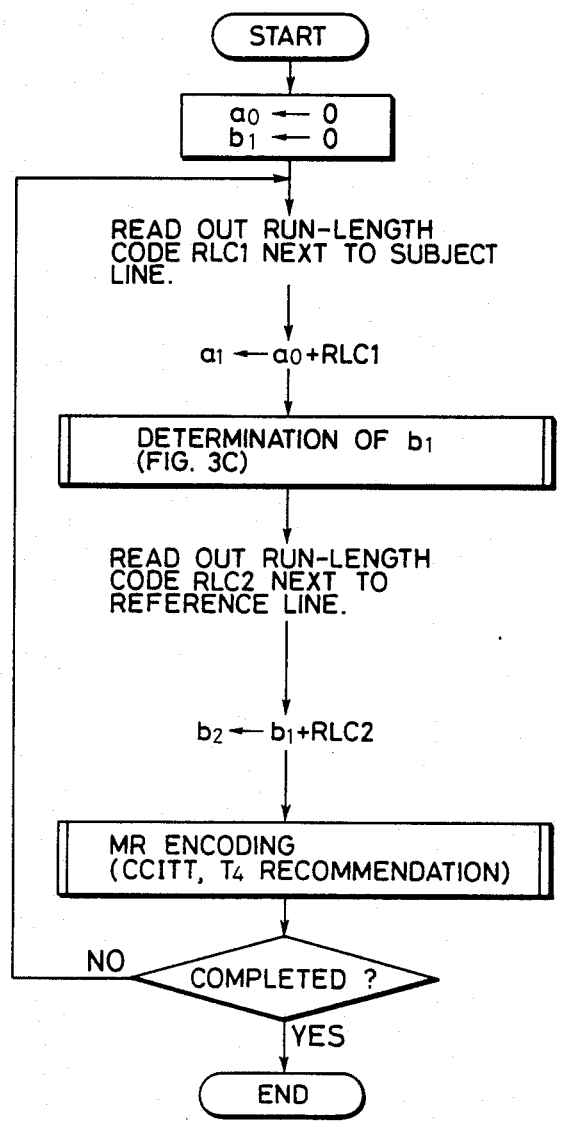
FIGS. 3B and 3C are flow charts for converting RL code into MR code.
Figure 3C:
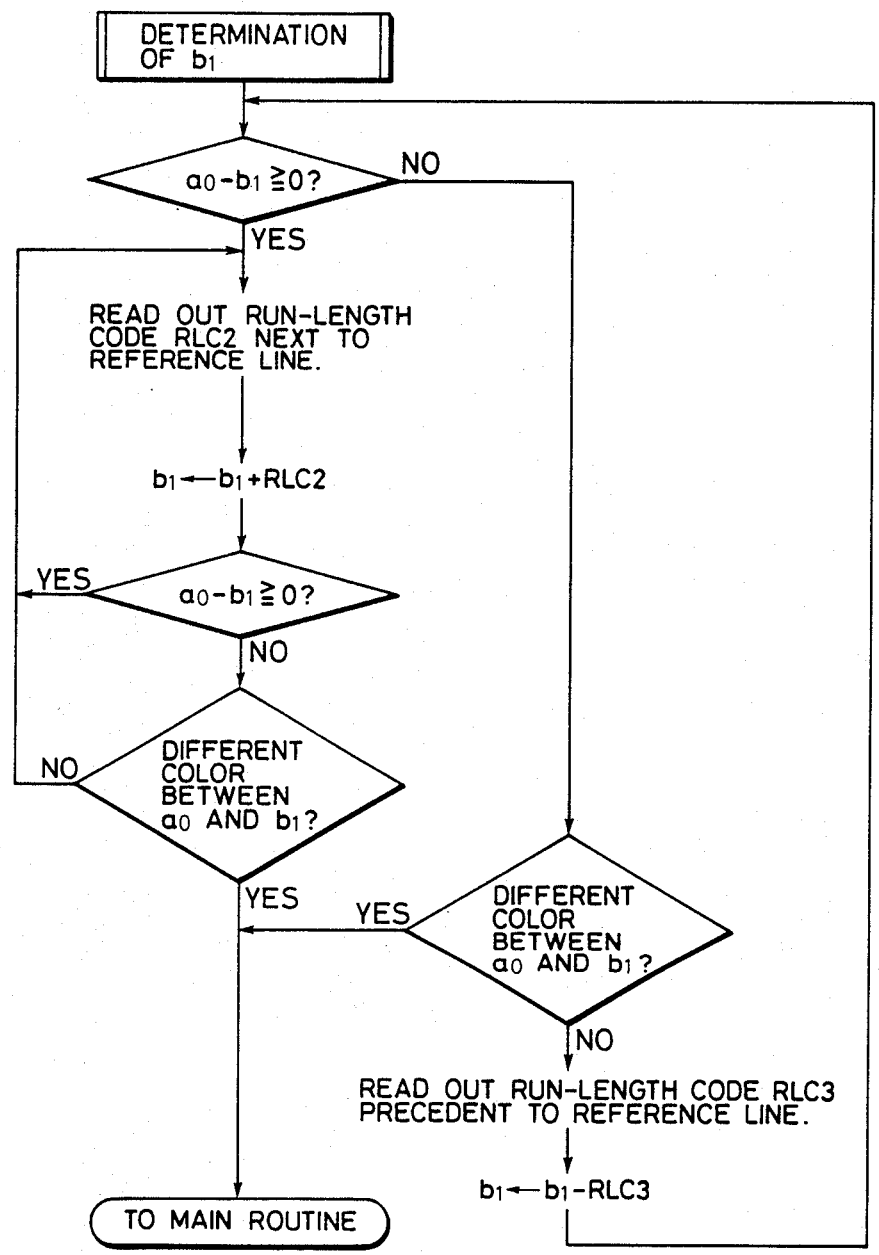

A program flow for converting RL code into MR code is shown in FIG. 3B, and a subroutine for deciding parameter $b_1$ is shown in FIG. 3C.

Referring to FIG. 3B, first parameters $a_0$ and $b_1$ are initialized to zero. Parameter $a_1$ is determined by reading out RL code next to an object line. After parameter $b_1$ is determined via the subroutine of FIG. 3B, parameter $b_2$ is determined by reading out RL code next to a reference line. In the MR encoding routine in conformity with T4 Recommendation, MR code is identified and simultaneously therewith the value next to parameter $a_0$ is decided.

In the subroutine shown in FIG. 3C, parameter $b_1$ is determined according to the definition of Recommendation that parameter $b_1$ is obtained when a first different color (white/black) from that of parameter $b_0$ appears on the right side of parameter $a_0$.

Conversion of RL code into MR code can be performed easily as compared with conversion of raw image data into MR code.

(c) Conversion of CG code into MH code

This apparatus has a function to transmit as image data information on such as characters other than image data read out by the read-out unit 1. To achieve such function, first, using CG code, raw data corresponding to CG code is fetched from CG 25. Raw data is converted into RL code and further into MH code for transmission. The output of this conversion table is not RL code but raw data. The reason for this is that if the conversion table is constructed of RL codes, the number of codes becomes large and accordingly necessitates a large CG table in capacity, while the capacity of CG 25 is intended to be reduced by using raw data. Furthermore, by using raw data, it is advantageous in that decoding is unnecessary in case of transfer in a non-compression mode such as G2 Mode.

(d) Handling of EOL

In transmission/reception in G3 Mode, image data is handled in line synchro. As a line synchro signal, EOL (End Of Line) is used. EOL is constructed of consecutive 11 "0s" and a single "1" (in case of MR code, "1" or "0" is additionally appended).

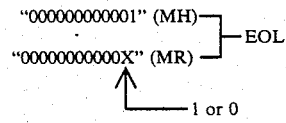

Each time MPU 23 detects one line end, it adds EOL to image data and transmit them together. In adding EOL, calculation of a transfer time on a transmission line is carried out. If the transfer time is shorter than the minimum transfer time, fill bits are inserted before addition of EOL so as to make the transfer time equal the minimum transfer time. In practical transmission, MH code is temporarily stored in FIFO RAM 9, and MPU 23 reads out MH code from RAM 9 to transmit it. Calculation of the minimum transfer time and insertion of fill bits are executed for transmission by reading MH code from RAM 9 under control of MPU 23. Therefore, how EOL is detected during reading RAM 9 becomes important. In the present apparatus, the following methods are employed for simplifying EOL detection during reading RAM 9 and EOL delivery.

Three basic concepts for handling EOL are:

(1) Addition of EOL is effected at the time of writing into RAM 9.

(2) Detection of EOL during reading from RAM 9 is achieved by detecting two bytes of consecutive 0s.

(3) During delivery of data in RAM 9, the second byte of 0s of the two bytes of consecutive 0s are not delivered. The description will proceed taking the following two exemplary cases in consideration.

The arrangement of data and EOL stored in RAM 9 is shown in FIG. 4 whereindata "1" in one line is present in the last byte. In the figure, image data of the last byte A is represented by DT. 0s are filled in after data DT in the byte A. Bytes B and C are all filled in with 0s, and IX is inserted in D byte. The number of 0s to be inserted before IX in D byte is decided as in the following Table, depending on the number of 0s inserted in A byte.

| Number of 0s inserted in A byte | 0 | 1 | 2 | more than 3 |
|---|---|---|---|---|
| Number of 0s added before 1X in D byte | 3 | 2 | 1 | 0 |
| Number of 0s when B or C byte is deleted | 11 | 11 | 11 | more than 11 |

As seen from the foregoing, 11 0s can be guaranteed even one byte 0s of EOL in RAM 9 is deleted during delivery of EOL.

Next, the arrangement of image data and EOL stored in RAM 9 is shown in FIG. 5 wherein data "1" in one line is not present in the last byte. As shown in the figure, if data DT included in the last byte A are all 0s, the remainder of byte A is filled in with 0s. Byte B is also filled in with 0s. In byte C, after 0s corresponding in number to a subtraction result of 11 by the number n of 0s inserted in byte A by 1, 1× are inserted.

| Number of 0s inserted in A byte | 7 | 6 | 5 |
|---|---|---|---|
| Number of 0s to be inserted in C byte | 4 | 5 | 6 |

Since MH code has no more than the last 4 consecutive bits all 0s, MH code with less than 4 0s inserted in A byte is not taken into consideration.

In case the of a white line skip transfer, as a discrimination criteria for all white, the second byte of "0s" are set as "01" (hexadecimal) for all white data in one line.

FIFO RAM 9 is written in the above-noted format. Therefore, in reading RAM 9, EOL detection is readily achieved by way of detecting two bytes of consecutive 0s or one byte of 0s and "01" (hexadecimal). Furthermore, during delivery of read-out data, EOL delivery is readily performed by deleting the second byte 0s (or "01". Although EOL delivery is possible without deletion of the second byte of 0s, deletion avoids delivery of unnecessary data to thereby result in a short transfer time.

Decoding Function (conversion of MH, MR codes into RL code)

(a) Conversion of MH code into RL code

Decoding is conducted through the MH to RL conversion table based on MH code fetched from FIFO RAM 9. In this case, the way to look up the table is different from that with the previously described RL to MH conversion table.

Figure 6:
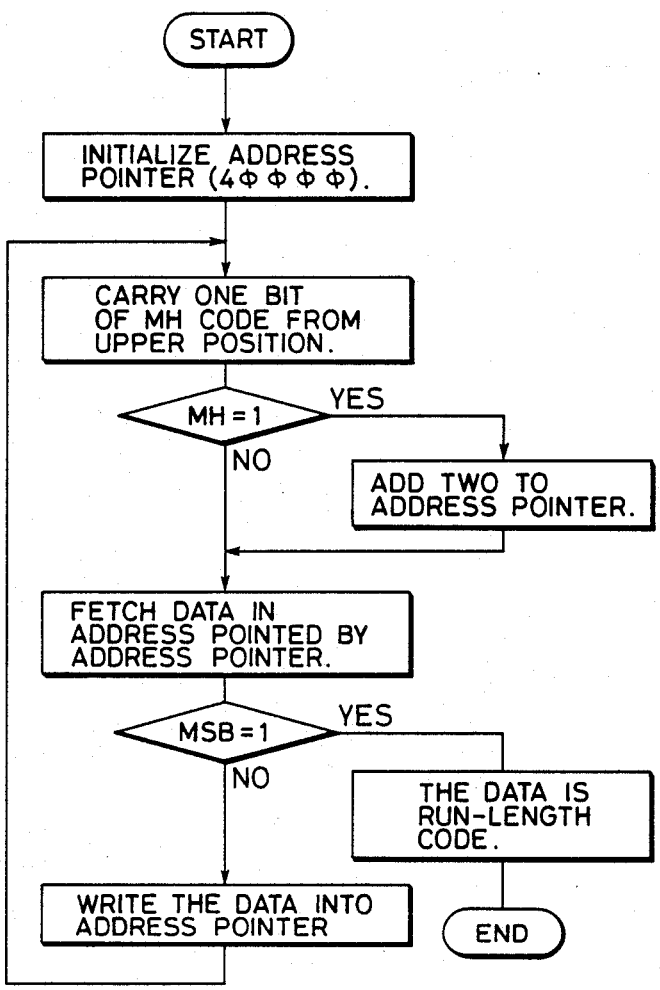
FIG. 6 is a flow chart for converting MH code into RL code.

FIG. 6 shows a conversion flow from MH code to RL code, and FIG. 7 is the MH to RL conversion table. As apparent from the flow shown in FIG. 6, MH code is searched one bit after another. In case the of "0", data at the address identified by the current address pointer is looked up, while in case the of "1", data at the next address identified by the current pointer is looked up. If MSB indicates "1", the data is the runlength. If "0", the data is written into the address pointer for use in the next search. In particular, until data (starting from 8 in decimal) having "1" at MSB is found, MH code is searched one bit after another. In FIG. 7, a search example of MH code of black "0000111" is shown. It is understood that MH code in this case corresponds to RL code of "black 12".

The conversion table differs for respectively black and white codes since some MH codes are the same for different black and white run-lengths.

(b) Conversion of MR code into RL code

This conversion is conducted using the conversion table, similarly to that with MH to RL conversion. However, in this case, data obtained at MSB=1 is not RL code but the content of a jump address of the program. Starting from the jump address, processing necessary for MR code is executed to generate RL code.

MR decoding employs two-dimensional compression, so that RL code corresponding only to single, independent MR code is not present. It is necessary to generate RL code by using MR code basing on data of the preceding line. Therefore, jump addresses of the program are written in the conversion table. A search example of MR code "000011" is illustrated in FIG. 8A. Calculation of Minimum Transfer Time and Insertion and Deletion of Fill Bits)

During G3 transmission, one line data added with EOL thereafter is being delivered. The transfer time for delivered one line data is calculated. If the calculated transfer time is shorter than the minimum transfer time, fill bits (0s) are inserted before addition of EOL to make the transfer time equal to or longer than the minimum transfer time.

In the present apparatus, a judgement as to whether or not delivered data is longer than the minimum transfer time is made depending on whether or not the number of delivered bytes is larger than the number of bytes calculated from the minimum transfer time and the transfer rate.

The number of delivered bytes during the minimum transfer time is:

$$\frac{9600 \times 10 \times 10^{-3}}{8} = 12 \text{ (bytes)}$$

assuming that the minimum transfer time is 10 ms and the transfer rate is 9600 bps. fill bits are inserted in unit of bytes.

In the apparatus, data to be transmitted, received, and stored in the memory during G3 mode is always transferred via FIFO RAM 9. If fill bits, which do not serve as image data, are stored in RAM 9, the capacity of RAM 9 is wasted.

Furthermore, since the number of fill bits varies with the capability of the partner machine to which the content of the memory is transmitted, the maximum number of fill bits must be inserted for storage in the memory, considering the longest possible, minimum transfer time and the transfer rate.

Therefore, in this embodiment, during transmission and storage in the memory in G3 mode, fill bits are not inserted in FIFO RAM 9 but after image data is read out of FIFO RAM 9 for transmission, they are inserted and delivered out.

In addition, during reception of image data, if more than three bytes of consecutive 0s are present, a byte of 0s after the third byte is not written in RAM 9.

Conversion of Fine to Standard

In this embodiment, a function to convert a fine mode to a standard mode is provided for transmission of image data stored as MH code in FIFO RAM 9. The line density in the main scan is the same 8 pel/mm for both fine and standard modes. However, the line density in the sub scan mode is 7.7 line/mm for the standard and 3.85 for the fine, i.e., half that of the standard. One line image data stored in FIFO RAM 9 is partitioned by EOL. In this apparatus, in transmitting image data in FIFO RAM 9, the conversion (of the scan line density) of the fine mode to the standard mode is effected each time on line image data in FIFO RAM 9 is transmitted.

Figure 8B:
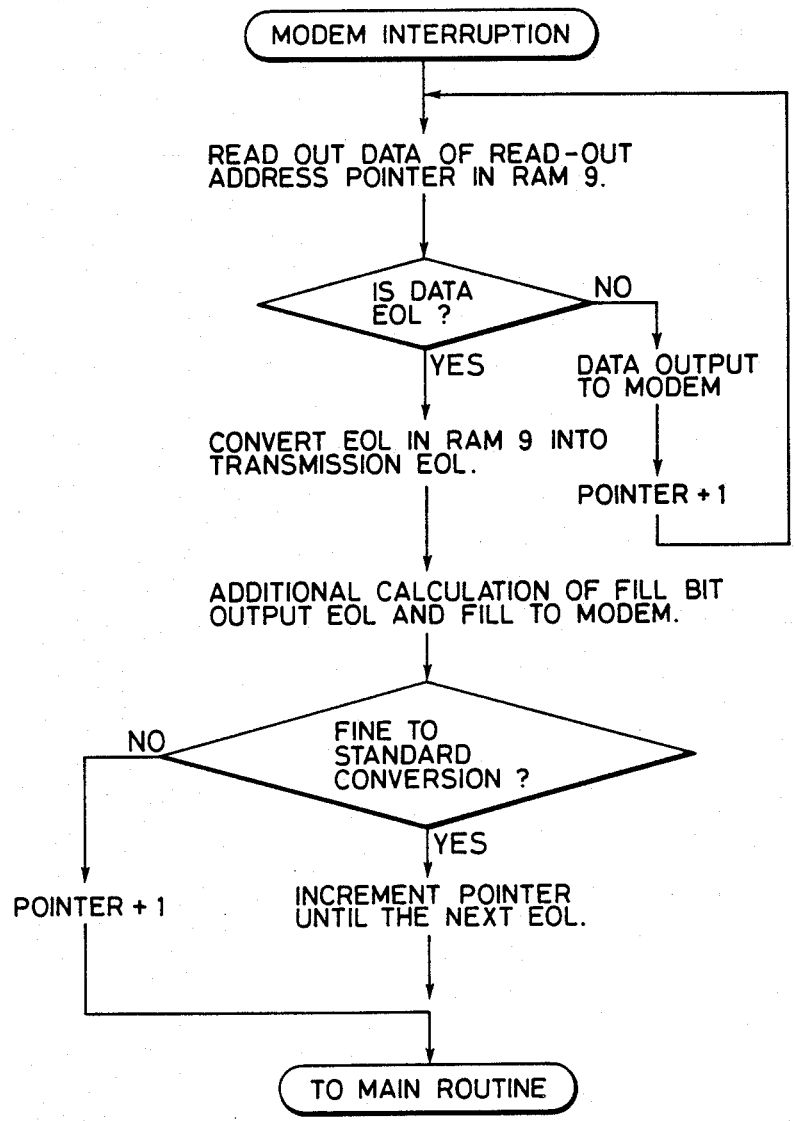
FIG. 8B is a flow chart illustrating the processing of MPU 23 when a data request interruption is received from modem 19.

A flow chart is shown in FIG. 8B for processing or not processing the scan line density conversion upon reception of a data request interruption from the modem.

Upon reception of an interruption, data indicative of the current read address pointer is read out of FIFO RAM 9. If it is not EOL, after the data is outputted to the modem, the pointer is incremented by 1 to repeat data transfer. If EOL is detected, as described previously, EOL in RAM 9 is converted into transmission EOL (Recommendation of CCITT). Thereafter, fill bits are added if necessary to output EOL and fill bits to the modem. Then, it is decided if a conversion of the fine mode into the standard mode is requested. If not requested, the pointer is incremented by 1 to terminate reading one line image data. Alternatively, if a conversion of the scan line density is necessary, the pointer is incremented to the next EOL and one line data is deleted to return to the main routine.

Conversion of RL into Raw Data

In transmitting image data in G2 mode, it is necessary to transmit image data stored as MH code in FIFO RAM 9 in the form of raw data. In the apparatus, such data conversion is conducted by software. To convert MH code directly into raw data is very difficult. Therefore, using the afore-mentioned decoding function MH code is first converted into RL code which in turn is converted into raw data, to accordingly simplify the program.

Figure 8C:
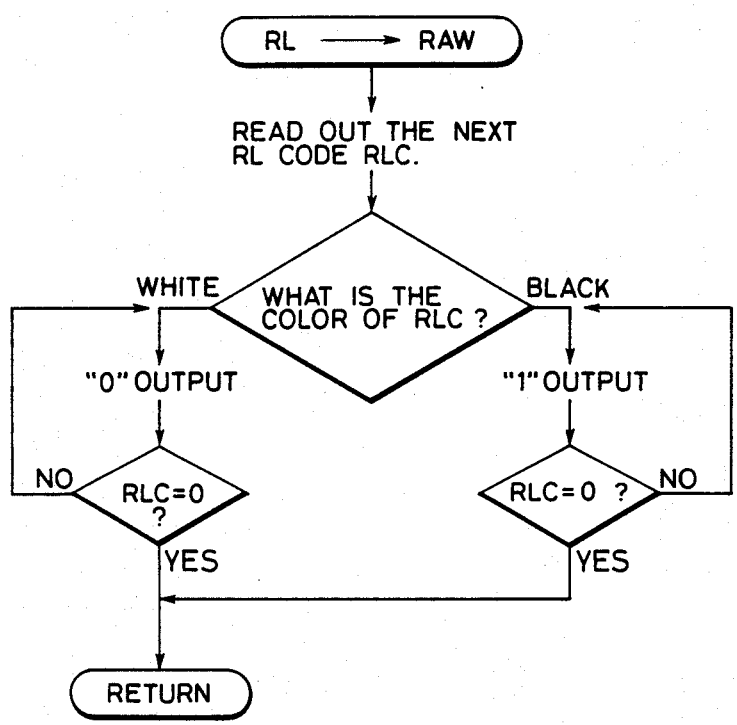
FIG. 8C is a flow chart for converting RL code into raw data.

The conversion of RL code into raw data is performed, for example, as shown in FIG. 8C.

More in particular, "1" is outputted onto the line memory if read-out RLC code is black data. This operation is repeated until RLC code becomes 0. "0" is outputted onto the line memory if read-out RLC code is white data. Similarly, this operation is repeated until RLC code becomes 0. Thus, the conversion of RL code into raw data is achieved.

Reduction of B4 to A4 by Software

In this embodiment, reading is effected by the read-out unit 1 having 2048 bit photosensor elements. Thus, it is possible to transmit a B4 original in 8 pel/mm. It is necessary, if a partner machine has a recording capability of only A4 size, to transmit B4 data by converting it into A4 data (1728 bits). In case of an ordinary transmission of an original, such conversion is processed either optically or electrically at the read-out unit 1. However in case of memory transmission, use of the reduction function the read-out unit 1 is impossible due to for example its flow of data. Consequently, in the present embodiment, the reduction is performed by software. First, data stored as MH code in RAM 9 is converted into RL code using the decoding function. Thereafter, a reduction process in the main scan direction of one line data is performed. Reduced RL code is again converted into MH code (in case of G2, into raw data) to transfer it to the modem.

The reduction in the sub-scan direction is performed, as discussed previously, thinning out image data in unit of one lines.

Figure 8D:
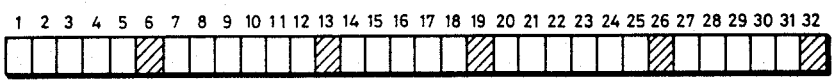
FIGS. 8D, 8E and 8F are views for illustrating a change in number of dots from B4 size to A4 size.

The conversion of the number of dots while converting B4 into A4 for RL code will be described with reference to FIGS. 8D, 8E and 8F.

The number of dots of one main scan line is 2048 for B4 and 1728 for A4. Through factorization of these numbers, a ratio of $32\times2^6:27\times2^6$, i.e., 32:27 is obtained. 2048 dots for B4 are divided into 64 blocks each having 32 dots. 5 dots are thinned out from each block consisting of 32 dots, to thereby obtain 27 dots for each block. FIG. 8D illustrates one block having 32 dots. The 6th, 13th, 19th, 26th and 32nd dots hatched in the figure are thinned out to enable a substantially uniform thinning density in the main scan direction.

Figure 8E:
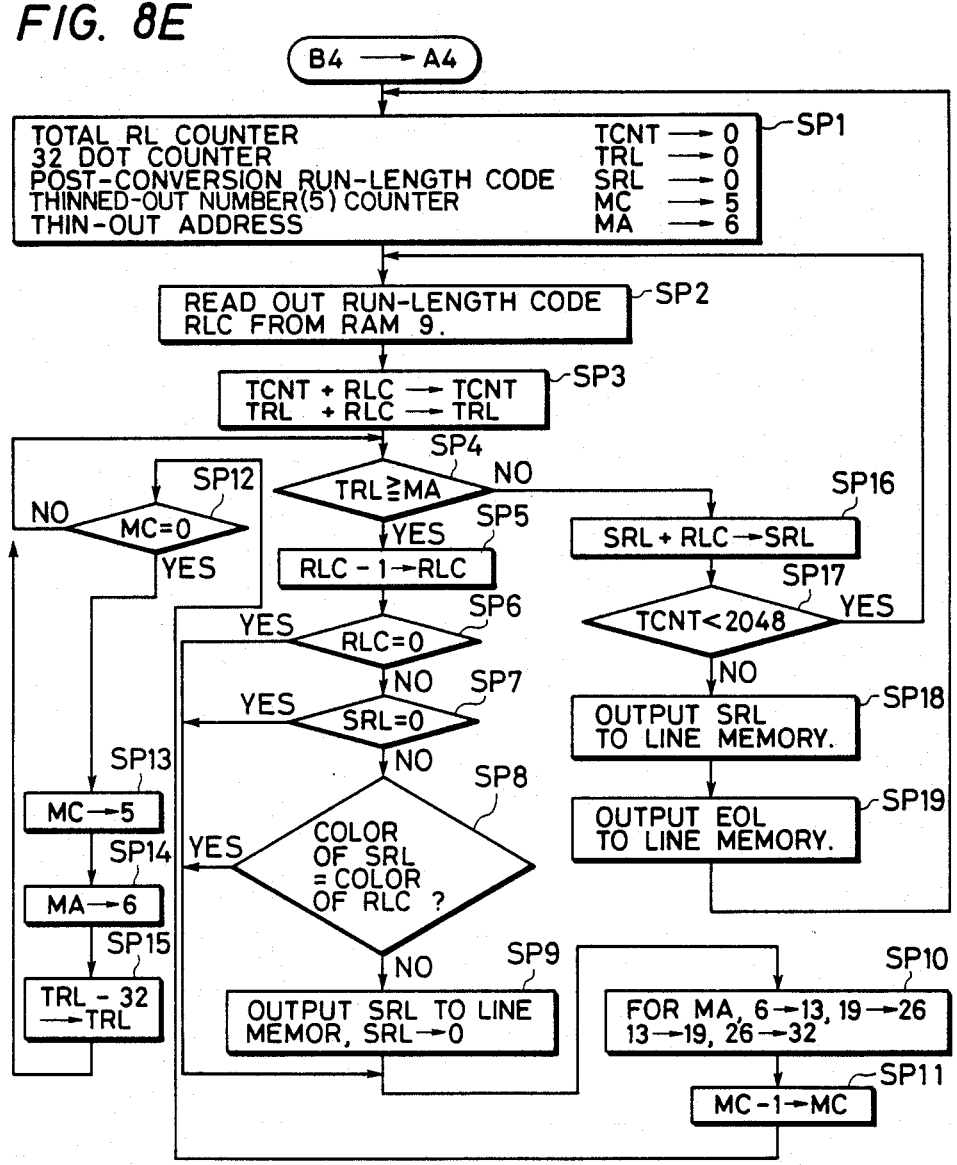

A flow chart for such conversion is shown in FIG. 8E. To facilitate the description of the flow chart, an example of the conversion of 32 dot code into 27 dot code will be explained assuming that 32 dot RL code has 8 white dots, 5 black dots, 15 white dots and 4 black dots.

First, at SP1, total RL counter TCNT, 32 dot counter TRL and run length code counter SRL for counting the number of dots after conversion, are initialized to 0 for the line concerned. Thin-out number counter MC for counting the number of dots to be thinned out is set at 5, while thin-out address counter MA is set at 6.

At SP2, the first run-length code RLC of 8 white dots is read out from RAM 9. At SP3, TCNT and TRL are both set at 8. Since TRL=8 is larger than MA =6, RLC of 8 white dots is converted into RLC of 7 white dots (SP5).

Since SRL becomes 0 at RLC=7 white dots, MA becomes 13 and MC becomes 4 at SP10, to thereby return to SP4. Since TRL=8 is smaller than MA=13 in this case, SP16 follows to set SRL at 7 white dots. Since TCNT is smaller than 2048, SP2 follows thereafter to obtain the next RLC=5 black dots, and TCNT and TRL both become 13. Since TRL equals MA=13, RLC becomes 4 black dots at SP6. At SP8, the colors of SRL=7 white dots and RLC=4 black dots differ so that at SP8, data of 7 white dots is outputted to the SRL is reset at 0. MA and MC are set at 19 and 3, respectively, to accordingly return to SP4 and further to SP16. In this case, SRL is set at RLC=4 black dots. Then, the next RLC=15 white dots is obtained and TCNT and TRL are set at 28. Since 28 is larger than MA=19, RLC=15 white dots is converted into 14 white dots. At SP8, since the color of SRL=4 black dots is different from that of RLC=14 white dots, data of 4 black dots is outputted to the line memory and SRL is reset at 0.

Then, MA and MC are set at 26 and 2, respectively. At SP4, since TRL=28 is still larger than MA=26, data of 14 white dots is further converted into 13 white dots. At this time, since SRL is 0, the judgement and output at SP8 and SP9 are not effected, but MA and MC are respectively set at 32 and 1 at SP10 and SP11.

Again at SP4, since MA=32 is larger than TRL=28 in this case, SRL is set at 13 white dots at SP16. After the next RLC=4 black dots is read out, 13 white dots are outputted at SP9, and similarly to the above, 3 black dots are outputted thereafter.

Figure 8F:
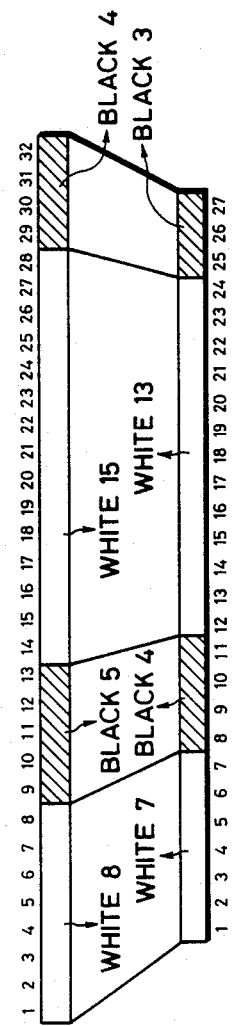

As seen from the foregoing, the upper data in FIG. 8F, i.e., 8 white, 5 black, 15 white and 4 black dots, are converted in a substantially uniform way into RLC of 7 white, 4 black, 13 white and 3 black dots.

SP14 and SP15 in the flow chart show initialization of MC, MA and TRL after completion of processings of one block of 32 dots. SP15 has also a control function for the case where RLC extends between two blocks. SP18 indicates the operation to output the last RLC in one line to the line memory.

As above, it is possible to convert the number of dots in the main scan direction using RLC only.

Operation Mode

A number of operation modes are available as shown in the following table for transmission/reception and transfer of image data. The flow of data and its coding for each mode will now be described with reference to the drawings.

| TRANSMISSION MODES | | |
|---|---|---|
| G3 original transmission | MH RAM 9 usable | M1 |
| G3 original transmission | MR RAM 9 usable | M2 |
| G3 original transmission | MH RAM 9 unusable | M3 |
| G3 memory transmission | MH | M4 |
| G2 memory transmission | | M5 |
| G2 original transmission | | M6 |
| RECEPTION MODES | | |
| G3 reception | MH RAM 9 usable | M7 |
| G3 reception | MR RAM 9 unusable | M8 |
| G3 reception | MH RAM 9 usable | M9 |
| G3 reception | MH RAM 9 unusable | M10 |
| G2 reception | | M11 |
| OTHER MODES | | |
| memory storage | | M12 |
| memory copy | | M13 |
| original copy | | M14 |

Figure 9A:
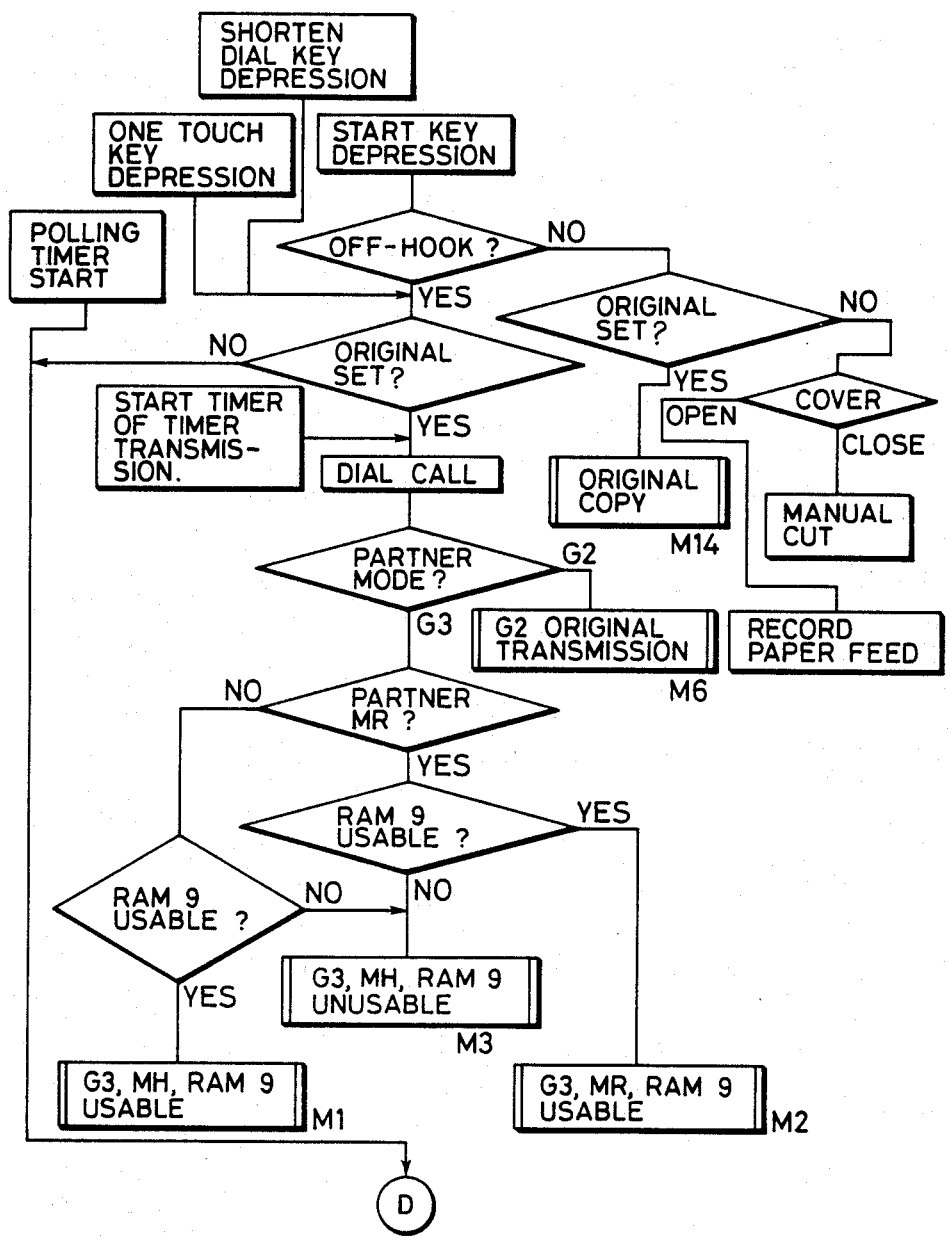
FIGS. 9A, 9B and 9C are flow charts for determining one of 14 operation modes of CPU 23.
Figure 9B:
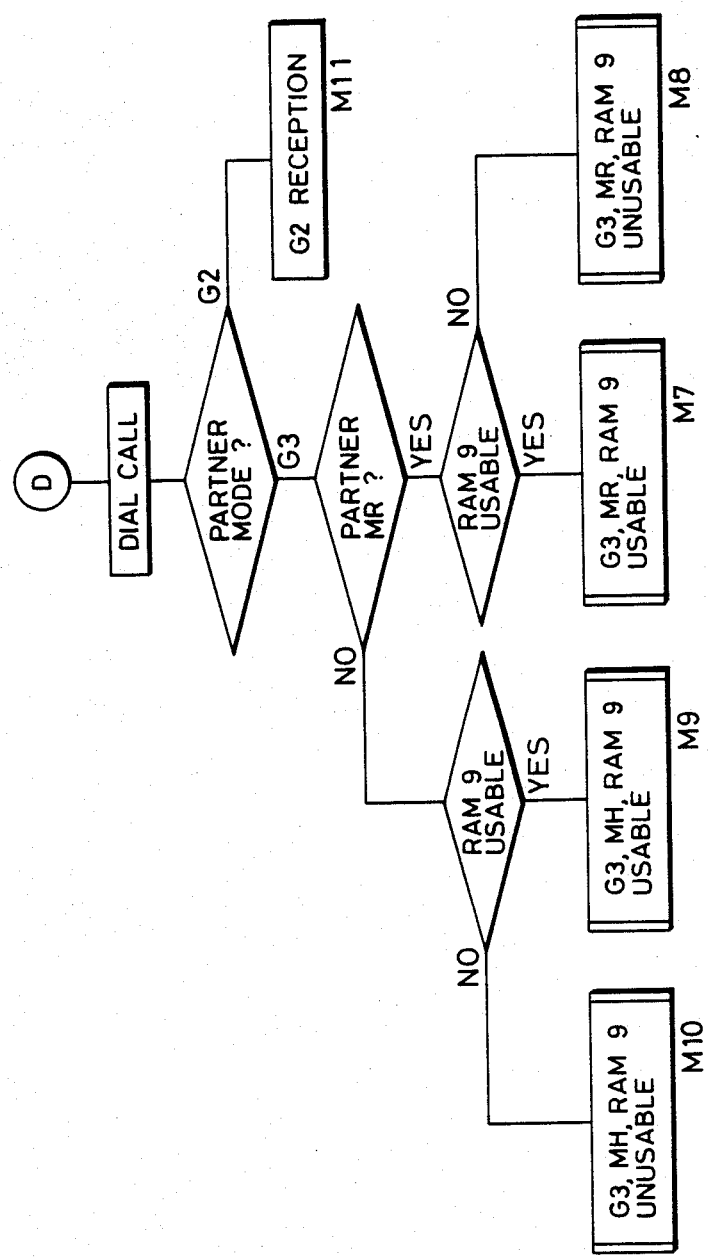
Figure 9C:
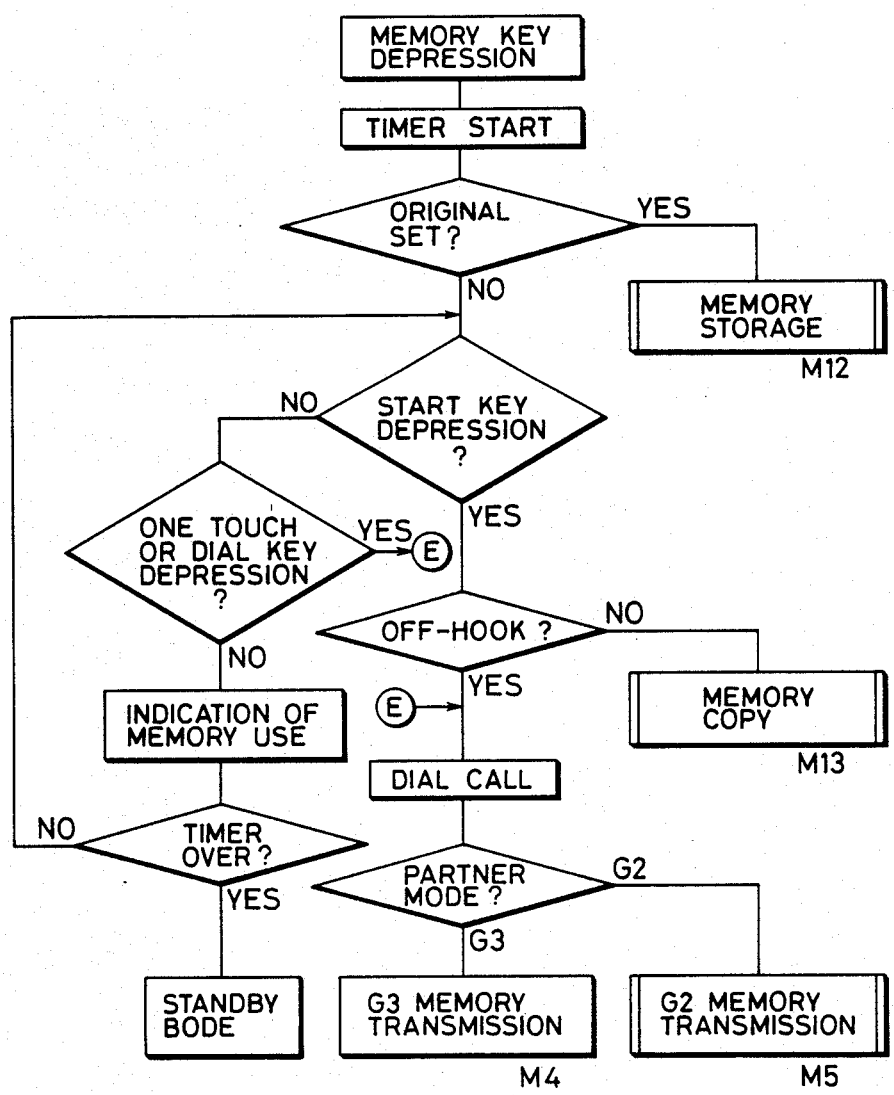

A flow chart of the Judgement algorithm of MPU 23 to be used for determination of one of the above 14 operation modes M1 to M14, is shown in FIGS. 9A, 9B and 9C.

Figure 10:
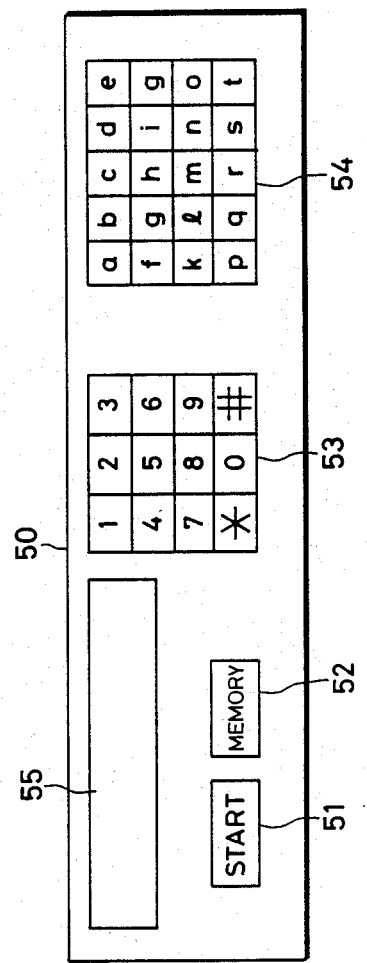
FIG. 10 is a plan view of an operation unit 50.

In the present embodiment, the operation mode is initiated upon actuation of a start key 51, one touch dial key 54, shorten dial key 53 or memory key 52 on the operation panel 50 shown in FIG. 10.

A Judgement/branch is initiated based on the outputs from a sensor 31 detecting presence or absence of an original, sensor 32 detecting the on-hook/off-hook state of a telephone, and roll paper cover sensor 33.

Pre-procedure signals prior to a message (image data) communication in facsimile communication enable to judge whether a partner machine is in G3 mode or G2 mode. Simultaneously therewith, it is possible to know whether the partner machine has an MR coding function or has only an MH coding function.

Furthermore, it can be judged if FIFO RAM 9 is usable or not in a message communication based on its work state of storage of the sender machine. If image data is being stored in RAM 9, it is unusable, while if image data is not stored in RAM 9, it is usable.

The operation modes to be decided by the flow chart are respectively designated by references M1 to M14.

First, upon depression of the start key, it is checked whether the telephone is in an on-hook or off-hook state as shown in FIG. 9A. In case of an off-hook state and if an original is present at the transmission position, original copy mode M14 follows. If an original is not present and the roll paper cover is closed, then the roll paper cutter is actuated. If the roll paper cover is open, the roll paper is fed by a predetermined amount.

In case of an off-hook state and if an original is present, then one of transmission modes M1, M2, M3 and M6 follows depending on the partner machine mode and depending on whether RAM 9 is usable or unusable. In case of an off-hook and an original is not present, a branch routine for reception modes as shown in FIG. 9B follows. In the figure, one of modes M7 to M11 is selected depending on the partner machine mode and depending on whether RAM 9 is usable or not.

FIG. 9C shows a mode branch routine when the memory key 52 is depressed.

Upon depression of the memory key 52, a timer in the form of software starts operating. If an original is placed during this time count operation, memory storage mode M12 follows to store image data of the original into RAM 9.

If the start key 51 is depressed without an original on the read-out unit 1 and if the machine is in an on-hook state, memory copy mode M13 follows where image data in RAM 9 is recorded at the record unit 17.

If the machine is in an off-hook state, one of memory transmission modes M4 and M5 follows. If the one touch key 54 and shorten dial key 53 are depressed, one of memory transmission modes M4 and M5 follows irrespective of the hook state. Memory transmission modes M4 and M5 are used respectively for G2 and G3 partner machines.

If the memory key is depressed but no other keys are actuated without an original on the read-out unit, then the storage amount of image data in RAM 9 is displayed on the display 55 (FIG. 10) and the program returns to a standby mode after the software timer counts up.

The flow of image data in each mode M1 to M14 will be described hereinunder.

Mode M1

G3 original transmission, MH, RAM 9 usable

The flow of image data in mode M1 will be explained with reference to FIG. 11.

One line image data read by the read-out unit 1 upon reception of a read-out command from MPU 23, is converted into RL code and stored into RAM 3. Under control of MPU 23, data in RAM 3 is directly transferred to two line buffers RAM 5 and RAM 7 alternately for each one line. RL codes read out of two line buffers are encoded into MH code to write it in FIFO RAM 9. Under control of MPU 23, upon reception of a data request interruption from the modem 19, MH code in FIFO RAM 9 is transferred to the modem one byte after another. At this time, the minimum transfer time for each line is calculated to insert fill bits.

Character information such as sender, transmission time and so on to be added to the head of the image is obtained in such a way that raw image data 25 outputted from CG 25 is converted into MH code and transferred to FIFO RAM 9.

In the figure, all of the data transfer is performed via the bus 24 of MPU 23 except for the transfer from the read-out unit 1 to RAM 3 and from the modem 19 to NCU 21.

The interval of data request interruptions from the modem 19 varies with the transfer rate. Since data transfer is effected in unit of bytes, an interruption occurs every $8/9600 = 0.83 \times 10 - 3$ sec, in case of 9600 bps for example.

At the end of data transfer from RAM 3 to RAM 5 and RAM 7, MPU 23 outputs a read-out command to the read-out unit 1. While MPU 23 performs an encoding process ENC and interruption process, the read-out unit 1 reads an original, and raw data is converted into RL data.

Mode M2

G3 original transmission, MR, RAM 9 usable

Figure 12A:
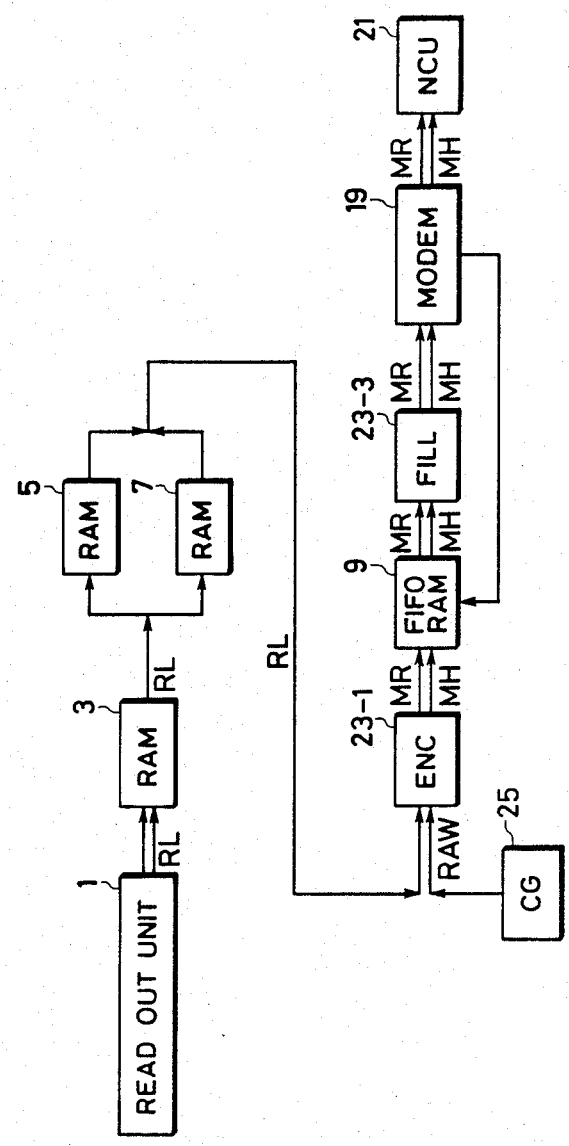
FIG. 12A is a block diagram showing a flow of image data in mode M2.

The image data flow, which is substantially the same as in mode M1, is shown in FIG. 12A. The difference is that the code after ENC 23-1 is MR code. However, data from CG 25 is outputted from ENC 23-1 is in the form of MH code. For instance, if a character of $24 \times 16$ dots is to be added to the head of the image, data for 24 lines is transferred in the form of MH code.

Figure 12B:
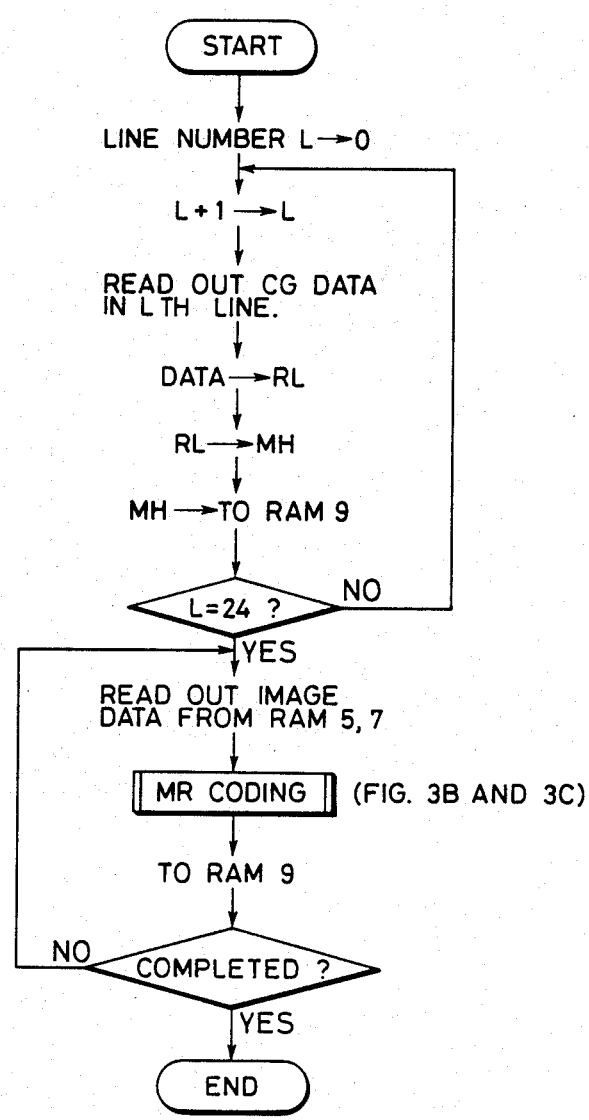
FIG. 12B is a flow chart for storing MH code in the form of CG data and MR code in the form of image data, respectively in RAM 9.

A program for storing CG data of MH code and image data of MR code is shown in FIG. 12B. First, the number L of lines of C data is initialized. Starting from the top line, each line data is read, converted from raw data into RL code and further into MH code, and stored in RAM 9.

After completion of such operations for 24 lines, image data in RL code is read out of either RAM 5 or RAM 7. RL code in each line is converted, based on the MR encoding routine shown in FIGS. 3B and 3C, into MR code to store it in RAM 9.

Mode M3

G3 original transmission, MH, RAM 9 usable

Figure 11:
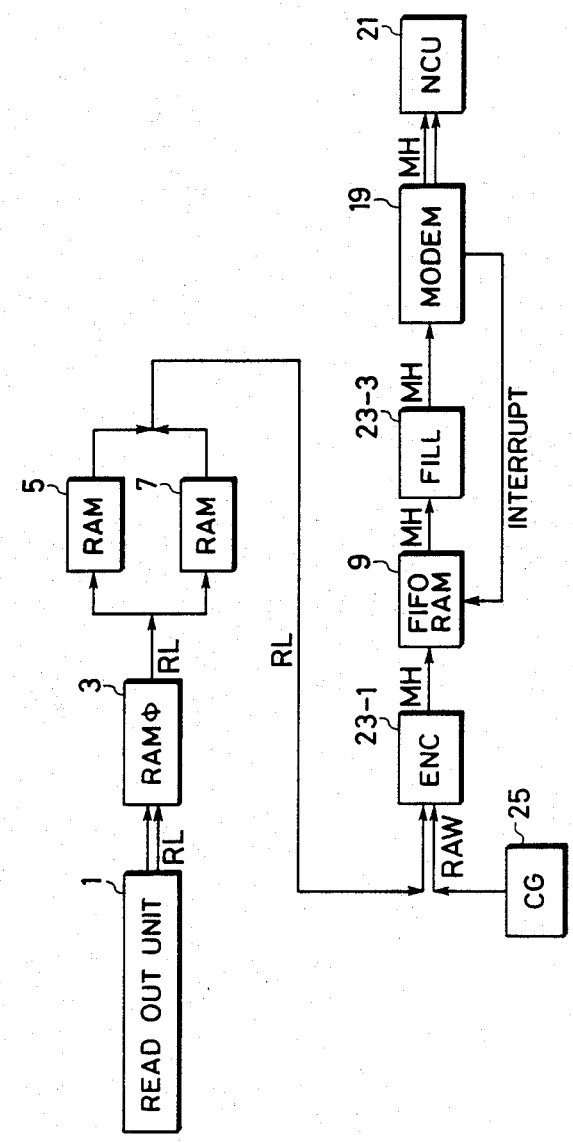
FIG. 11 is a block diagram showing a flow of image data in mode M1.
Figure 13:
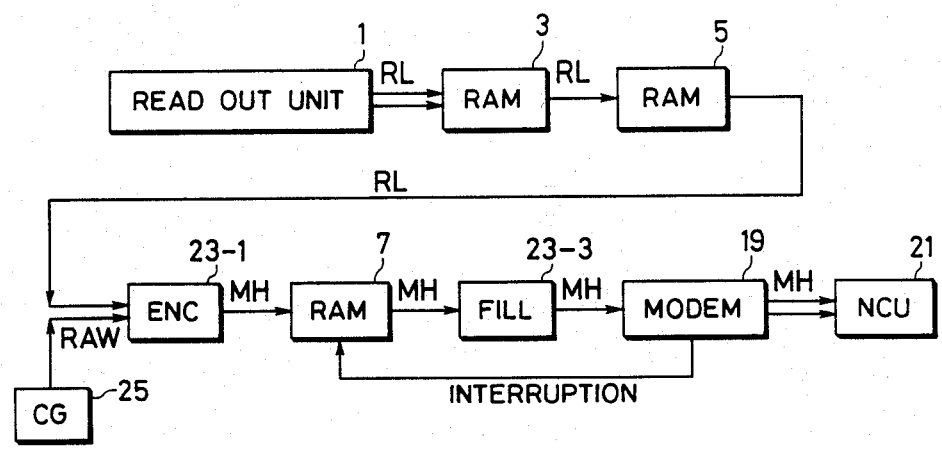
FIG. 13 is a block diagram showing a flow of image data in mode M3.

The flow of image data is shown in FIG. 13, As different from the case where RAM 9 is usable as shown in FIG. 11, RAM 7 used as the line buffer is here used as a line buffer for MH code. Therefore, there is only a single line buffer RAM 5 and encoder ENC 23-1 can handle only one line data. Therefore, MR transmission is impossible in case RAM 9 is unusable.

The reason is that it is necessary for MR encoding to prepare line buffers for two lines, i.e., currently encoding line and reference line.

Mode M4

Figure 14A:
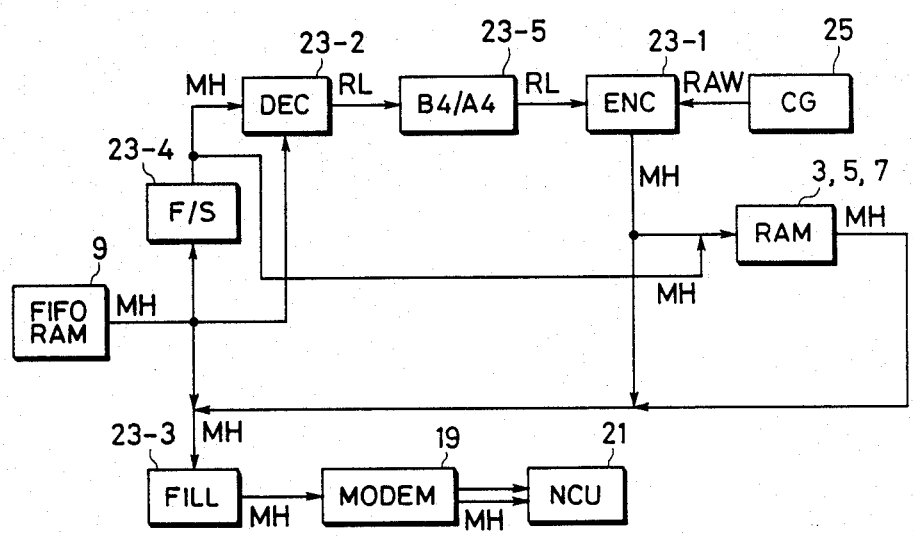
FIG. 14A is a block diagram showing a flow of image data in mode M4.
Figure 14B:
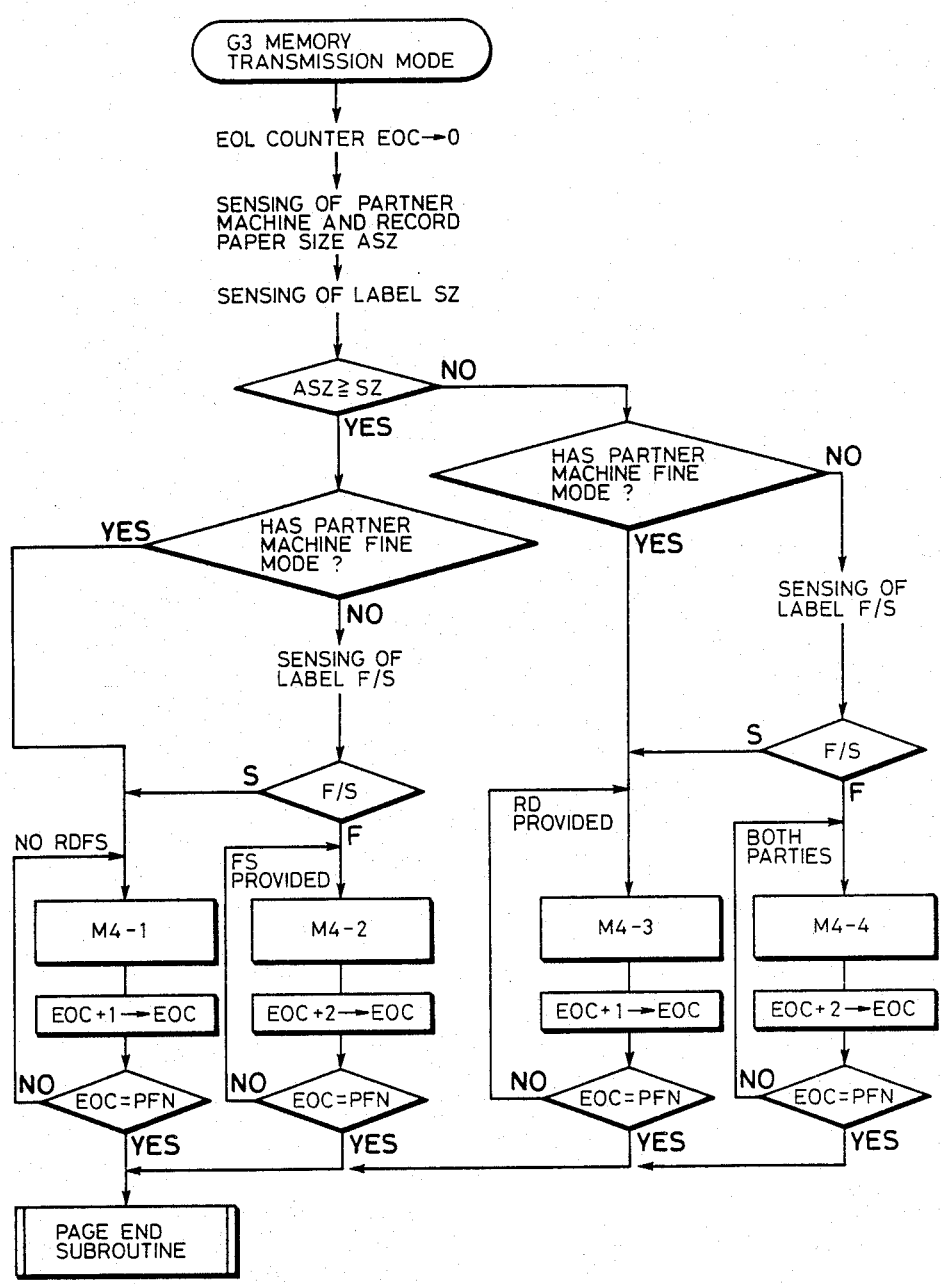
FIG. 14B is a flow chart showing how mode M4 is branched to one of modes M4-1 to M4-4 in conformity with a partner machine.
Figure 14C:
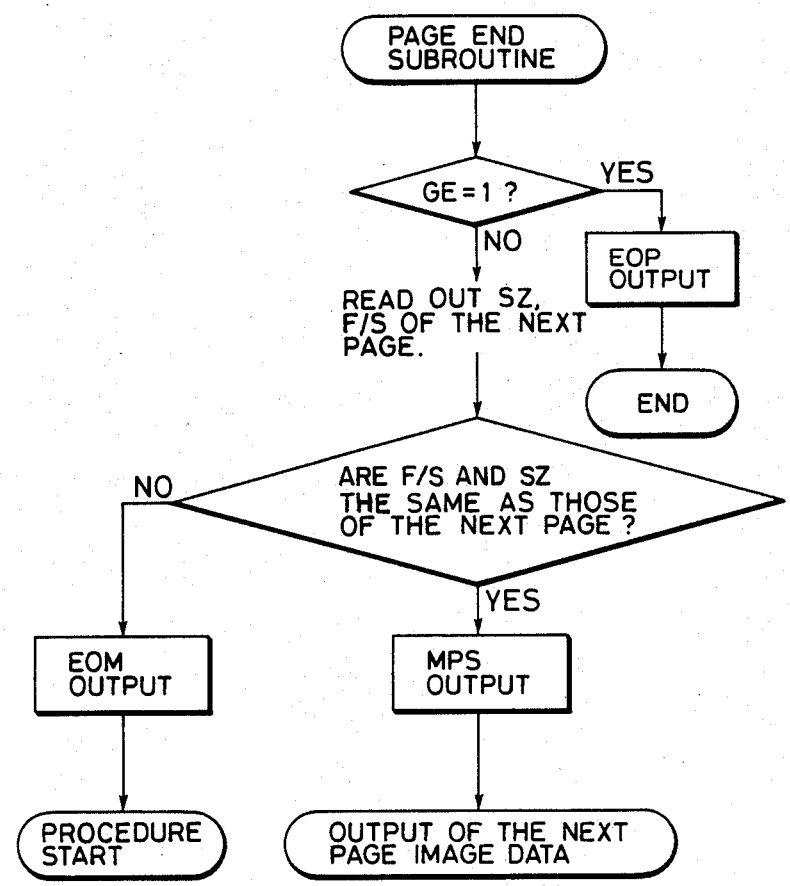
FIG. 14C is a flow chart showing a page end subroutine.

G3 memory transmission, MH . . . FIGS. 14A, 14B and 14C

Figure 21:
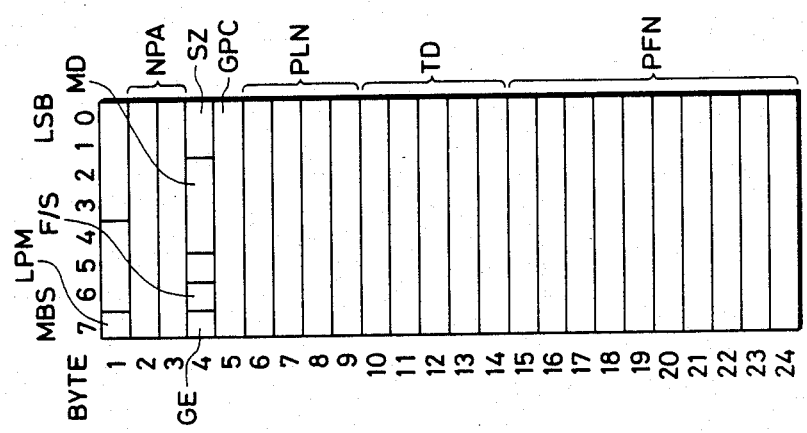
FIG. 21 shows a format of a file management label appended to the page head in RAM 9 while storing image data in RAM 9.

The flow of image data in mode M4 is shown in FIG. 14A. Image data read in the fine or standard mode is stored in FIFO RAM 9 in the form of MH code. At the top of a page, various information associated with image data is stored as a label as shown in FIG. 21. Such information is for example read size SZ (the number of dots in the main scan) of image data, fine or standard mode F/S (the main scan line density), the number PFN of EOLs in the page and the like.

In case the record paper size of the partner machine is smaller than read size SZ, it is necessary to perform the above-described conversion of the number of dots in the main scan. In addition, in a case where the partner machine has only the standard mode although image data has been stored in RAM 9 in the fine mode, it is necessary to perform the above-described scan line density conversion.

FIG. 14B shows a branch routine in such cases. In the figure, first counter EOC for counting EOLs is set 0. The record paper size ASZ of the partner machine is sensed during the preprocedure to compare it with label SZ. If ASZ is equal or larger than SZ, then mode M4-1 or M4-2 is selected. In this case, conversion of the number of dots in the main scan line is not necessary.

If the partner machine has not the fiee mode although image data has been stored in RAM 9 in the fine mode, conversion of the sub-scan line density is also necessary, and mode M4-2 or M4-4 is selected.

That is, in M4-1, both conversions of the main scan dot number and sub-scan line density are not required. In M4-2, only conversion of the sub-scan density conversion is required. In M4-3, only conversion of the main scan dot number is required, while in M4-4, both conversions are required.

Although the detailed description for the flow of image data for each mode will be given later, it is simply mentioned here that EOL counter EOC is incremented by 1 in modes M4-1 and M4-3, while EOC is incremented by 2 in modes M4-2 and M4-4 and that when EOC equals PFN representative of the number of EOLs in the page, a page end subroutine follows.

In the page end subroutine shcwn in FIG. 14 C, label GE is checked to determine if it represents the last page among a number of pages stored in RAM 9. If the page concerned is the last one among a number of pages, EOP indicating the end of transmission is outputted to the partner machine and the transmission is terminated. If the page concerned is not the last one, SZ and F/S of the next page are read. In case of the same F/S and SZ as of the preceding page, MSP indicating that the next page is transmitted in the same mode, is outputted. Alternatively, if F/S and SZ are different from those of the preceding page, EOM indicating that the pre-procedure should be started again from the beginning, is sent to the partner machine.

The flow of image data for each mode M4-1 to M4-4 will be described hereinunder.

M4-1

Conversion of the main scan dot and sub-scan line density is not conducted.

Image data in RAM 9 is added with fill bits at fill 23-3 and transferred to the modem 19 via NCU 21. Raw data from CG 25 is not directly transferred to fill 23-1 but is MH coded at ENC 23-1.

M4-2

Conversion of the sub-scan line density is conducted.

Under control of MPU 23, MH code from RAM 9 is converted from that of the fine mode to that of the standard mode in the form of MH code at F/S 23-4, i.e., data for every second line is deleted, to output the result to RAM 3, RAM 5 and RAM 7. MH data in RAM 3, RAM 5 and RAM 7 is added with fill bits at fill 23-3 and transferred to the modem 19. Raw data outputted from CG 25 is also outputted to fill 23-3 via ENC 23-1 and RAMs 3, 5 and 7.

M4-3

Conversion of the main scan dot number is conducted.

Under control of MPU 23, image data in MH code is read out of RAM 9 and converted in RL code at DEC 23-2 to conduct conversion from B4 into A4 in the form of RL code. Converted RL code is again converted at ENC 23-1 into MH code which is outputted to RAMs 3, 5 and 7 used as FIFO memories Thereafter, fill bits are added at fill 23-3 to transfer the result to the modem 19. Raw data outputted from CG 25 is also converted into MH code at ENC 23-1 to transfer to fill 23-3 via RAMs 3, 5 and 7.

M4-4

Both conversions are conducted.

Under control of MPU 23, MH data in FIFO RAM 9 is subjected to F/S conversion in the form of MH code, converted into RL code at DEC 23-2, and subjected to B4/A4 conversion. Converted RL code is again converted to MH code at ENC 23-1 which is transferred to RAMs 3,5 and 7. The output of CG 25 is also transferred to fill 23-3 via ENC 23-1 and RAMS 3, 5 and 7.

Mode M5

Figure 15:
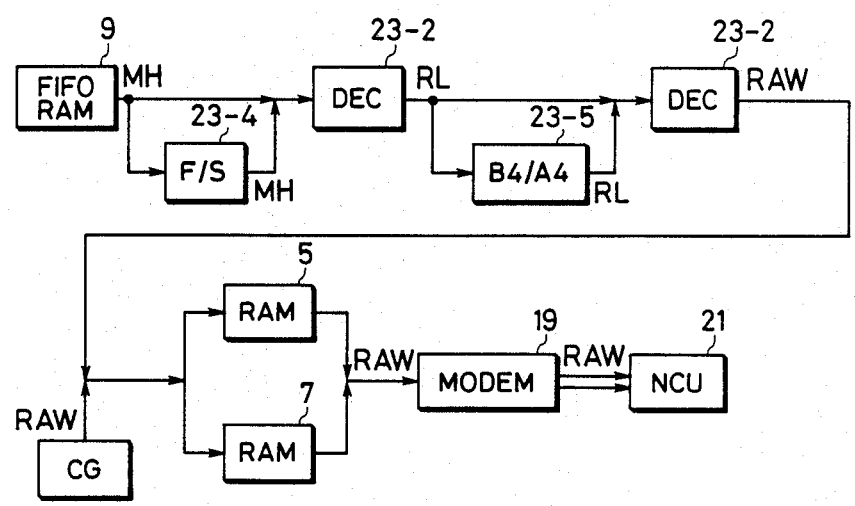
FIG. 15 is a block diagram showing a flow of image data in mode M5.

G2 memory transmission ... FIG. 15

Under control of MPU 23, MH code is read out of FIFO RAM 9 to decode it into RL code and hence into raw data RAW to transfer it to RAMs 5 and 7 alternately for each one line. Raw data is sequentially read out of RAMs 5 and 7 to transfer it to the modem 19. Mod conversion from the fine to the standard is performed at F/S 23-4 between RAM 9 and DEC 23-2, while reduction conversion of the size is performed at B4/A4 23-5 between two DECs 23-2.

Output data from CG 25 is transferred to the modem 19 via RAMs 5 and 7 in the form of raw data RAW. In this case, however, the output data from CG 25 is not subjected to thinning scan lines, but is delivered at 7.7 line/mm in the sub-scan direction to make the character size double that in G3 mode. The reason is to ensure a reliable reading of transmitted information in spite of a greatly degraded image quality due to analog communication in G2 mode.

Mode M6

Figure 16:
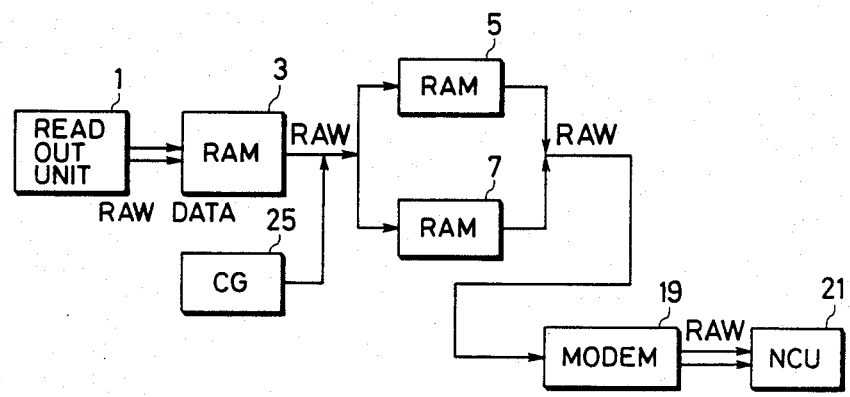
FIG. 16 is a block diagram showing a flow of image data in mode M6.

G2 original transmission ... FIG. 16

All of the data transfer are performed in the form of raw data. One line image data read out by the read-out unit 1 upon reception of a read command from MPU 23, is written in RAM 3 in the form of raw data. Under control of MPU 23, raw data in RAM 3 per se is transferred to two line buffers RAM 5 and RAM 7 alternately for each line. Upon reception of a request interruption from the modem, raw data is transferred from RAM 5 or RAM 7 to the modem 19 one byte after another.

Character information such as sender particulars to be added to the top of an image is transferred to RAMs 5 and 7 from CG 25 in the form of raw data.

In G2 mode, 1728 bit image data including synchro signals is written in RAMs 5 and 7. Image signals corresponding to these synchro signals are produced under control of MPU 23.

Modes M7 and M8

Figure 17:
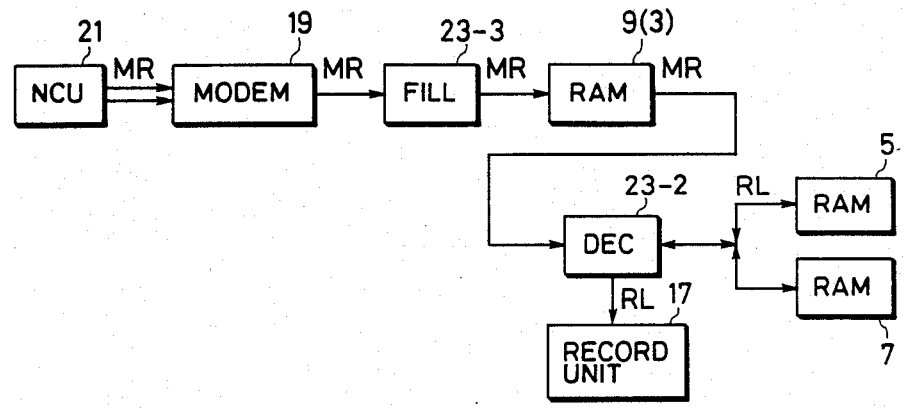
FIG. 17 is a block diagram showing a flow of image data in modes M7 and M8.

G3 reception, MR, RAM 9 unusable (usable)... FIG. 17

As MR code is received under control of MPU 23 from the network via NCU 21 and modem 19, fill bits are first deleted and thereafter, MR code with fill bits deleted is transferred to RAM 9 in case of empty storage thereof or to RAM 3 in case of memory storage in RAM 9. MR code is sequentially read from RAM 9 or RAM 3, decoded into RL code and thereafter transferred to RAM 5 and RAM 7 alternately for each line. Simultaneously therewith, RL code is transferred to the record unit 17 to record it. Decoded RL code is transferred to RAM 5 and RAM 7 to store it for use as preceding line information in MR coding.

Modes M9 and M10

Figure 18:
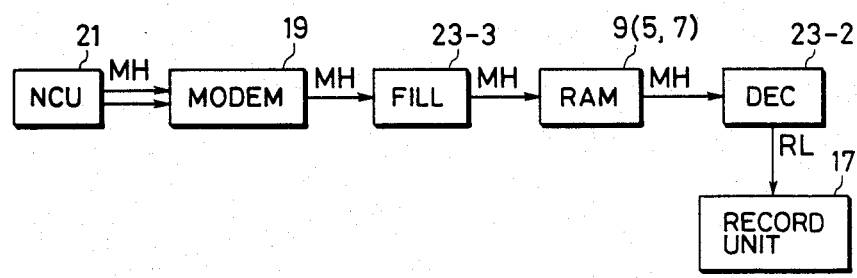
FIG. 18 is a block diagram showing a flow of image data in modes M9 and M10.

G3 reception, MH, RAM 9 usable (unusable) ... FIG. 18

As MH code is received under control of MPU 23 from the network via NCU 21 and modem 19, fill bits are first deleted and transferred to the form of MH code into RAM 9 if it is unusable or to RAM 3 if RAM 9 is unusable RAM 9 fetches MH code from RAMs 3, 5 and 7 and converts it into RL code to transfer it to the record unit 17 for recording

Mode M11

Figure 19:
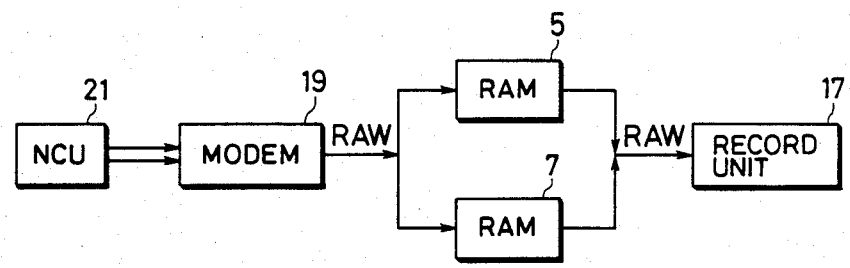
FIG. 19 is a block diagram showing a flow of image data in mode M11.

G2 reception ... FIG. 19

Non-compressed, raw data is transmitted in G2 mode. Therefore, raw data received under control of MPU 23 from the network via NCU 21 and modem 19 is transferred to line buffers RAM 5 and RAM 7 alternately for each line. Raw data is sequentially read out of RAM 5 RAM 7 to transfer it to the record unit 17 for recording.

A 1728 bit image signal corresponding to one line and demodulated by the modem 19 is written in RAM 5 and RAM 7. Since the image signal includes signals demodulated from synchro signals, transfer of image signal to the record unit 17 under control of RAM 23 is performed by removing the signals corresponding to the synchro signals.

Mode M12

Figure 20:
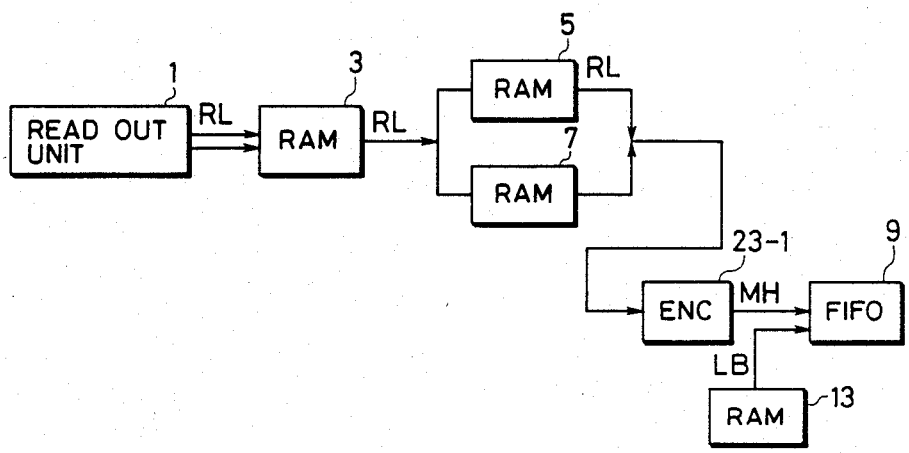
FIG. 20 is a block diagram showing a flow of image data in mode M12.

Memory storage ... FIG. 20

The processes up to the storage in FIFO RAM 9 in the form of MH code is substantially the same as those in Mode 1. The difference is that data from CG 25 is not present and that file management label LB is added to the top of a page during transference to RAM 9 from RAM 13.

The description is here directed to such labeling.

Label LB is constructed of 24 bytes as shown in FIG. 21. LPM and NPA are allocated in the first to third bytes, the former indicating that data affixed therewith is the last page of image data, and the latter indicating the location where the next page head address is stored. In the fourth byte, information on each page is stored. The MSB of the fourth byte stores information GE, which in case of image data is divided in unit of groups other than in unit of pages, indicates if the page concerned is the last page of the group or not. F/S stores scan line density data indicating if it is a standard one (3.85 lines/mm) or a fine one (7 line/mm).

MD stores information on the code type of data stored in RAM 9, i.e., MH, MR, RL, RAW or ASCII. SZ stores information on the read-out size of data in RAM 9, i.e., A4, B4 or A3.

Stored in the fifth byte is GPC which indicates the page number in the group in case that image data is divided in units of groups. In the sixth to ninth bytes, the total number PLN of lines is stored. In the tenth to fourteenth bytes, the time when memory storage was performed is stored. The "minute", "hour", "day", "month" and "year" are respectively stored in the 10, 11, 12, 13 and 14th bytes. In the 15th to 24th bytes, encoded file name PFN of the page concerned is stored.

Decision of a mode, addition of information and the like during memory transmission and memory copy are achieve based on information of label LB. As to time data, the time when memory storage was performed is printed as a header during memory copy based on information of label LB, while the transmission time is transmitted during memory transmission neglecting information of label LB. The reason is that, if time designated transmission is performed, the printed time on the received image is so made not to become the time when it was stored in RAM 9 but to become the time when actually transmission was started.

Figure 22:
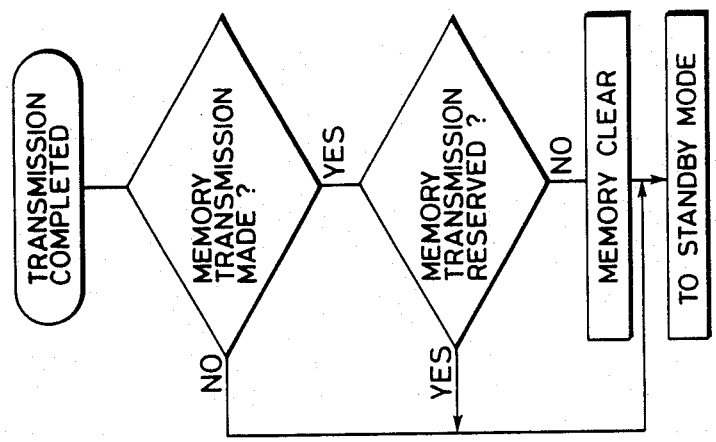
FIG. 22 is a flow chart for automatically clearing image data in RAM 9.

Image data and label LB once stored in RAM 9 are manually cleared by the operator or automatically cleared. The flow of automatic clear is as shown in FIG. 22.

Memory clear is not effected after operation of memory copy.

Mode M13

Figure 23A:
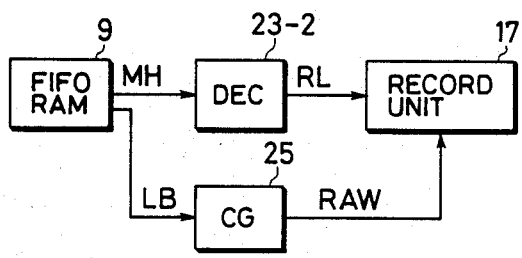
FIG. 23A is a block diagram showing a flow of image data in mode M13.

Memory copy . . . FIG. 23A

MH code is sequentially read out of DRAM 9 under control of MPU 23 and converted into RL code to transfer it to the record unit 17 for recording. As to header information, the character code is converted into raw data under control of MPU 23 to transfer it to the record unit 17 for recording. As to the time in the header, the time when memory storage was effected and which is being stored in management label LB in RAM 9, is converted into an image by means of CG 25 to record it at the record unit 17.

Figure 23B:
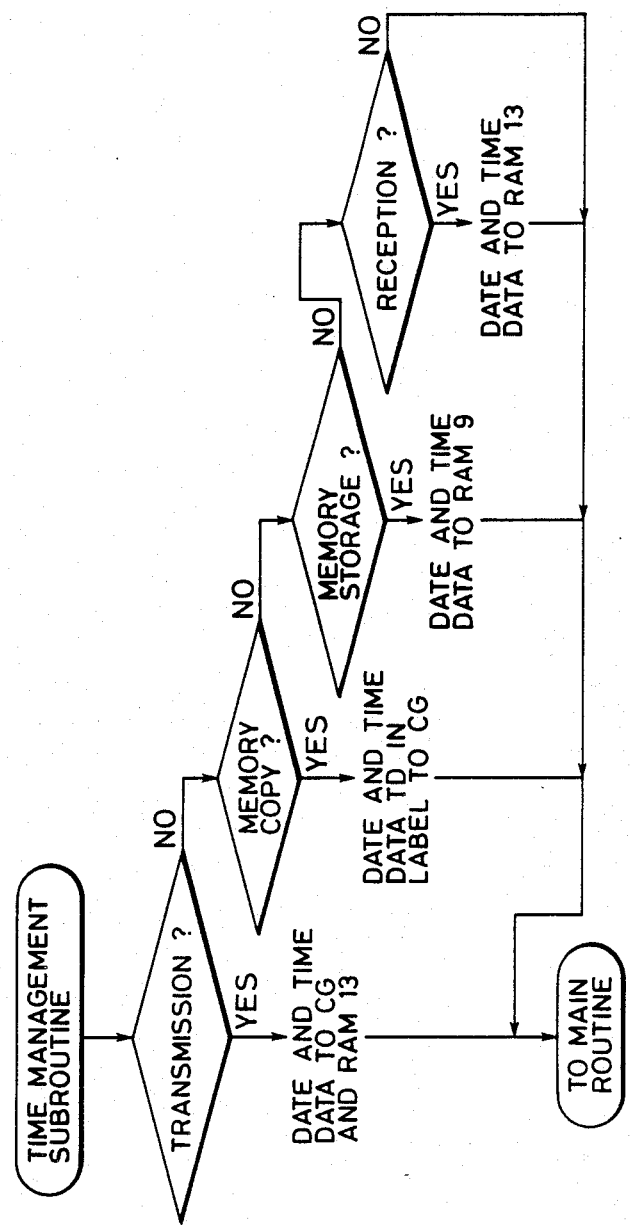
FIG. 23B is a flow chart showing a time management subroutine.

A time management subroutine is shown in FIG. 23B. First, in transmission mode, data and time data of the clock 27 (FIG. 1) under management of MPU 23 is outputted to CG 25 to transmit the transmission time together with image data. Simultaneously therewith, the time as well as the telephone number of the partner is stored in communication management RAM 13. In case the of the operation of memory copy, date and time data TD in label LB is outputted to CG 25. In case the of the operation of memory storage, date and time data of the clock is outputted as data TD in RAM 9. In case of reception, data of the clock as well as the telephone number of the partner is stored in RAM 13. In case of the operation of original copy, date and time data is not considered at all.

Mode M14

Figure 24:
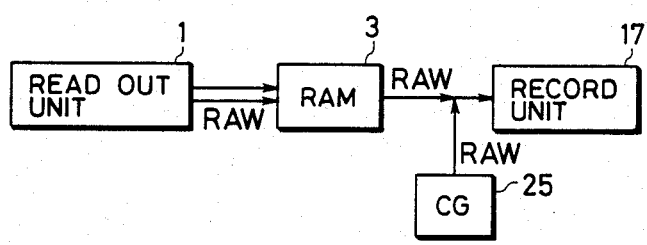
FIG. 24 is a block diagram showing a flow of image data in mode M14.

Original copy . . . FIG. 24

One line image data read by the read-out unit 1 upon reception of a read-out command from MPU 23, is written in RAM 3 in the form of raw data RAW. Raw data is sequentially read out of RAM 3 under control of MPU 23 to transfer it to the record unit 17 for recording. Output data from CG 25 is transferred to the record unit 17 in the form of raw data for recording.

As seen from the foregoing description of each transmission mode of this embodiment, the read-out unit 1 outputs image data either as RL code or raw data to store it in RAMs 3,5 and 7 depending whether the transmission mode is G3, i.e., compression transmission or G2, i.e., raw data transmission.

Therefore, in MH or MR encoding transmission, the encoding processing can be made at a high speed and in addition it is not necessary to decode for G2 transmission. Furthermore, since separate RAMs are not needed for raw data and RL data, an effective usage of RAM is possible.

The image transmission of one aspect of the present invention comprises: read-out means for reading an image and conveting said image into an image signal; storage means for temporarily storing said image signal; means for encoding an image signal in said storing means; and means for transmitting said image signal or said encoded signal; wherein the form of storage of an image signal in said storage means differs depending on whether said encoding means is used or not. Therefore, an effective usage of said storage means is possible. Furthermore, in case of using said encoding means, it is possible to perform encoding processing at a high speed by storing an image signal in a suitable form for encoding, e.g., storing in said storage means in the form of RL code. Also, it is not necessary to decode in case raw data per se is transmitted.

The image transmission apparatus of another aspect of the present invention comprises: means for storing an image signal; means for converting the number of dots of one line image signal in said storage means; and means for selectively transmitting the output of said conversion means or an image signal in said storage means.

With the construction as above, it is possible to transmit data stored in said storage means with the number of dots in one line suitable for a partner machine. Thus, communication capability is improved and of the form of data to be stored in said storage means is not limited.

Furthermore, according to the present invention, since means for converting the number of dots can operates without converting a compression signal to an original raw image signal, it is possible to shorten the time required for converting the number of dots.

The image transmission apparatus of another aspect of the present invention comprises: means for storing an image signal; means for converting the scan line density of an image signal in said storage means; and means for selectively transmitting the output of said storage means or an image signal in said storage means. With the construction as above, it is possible to transmit an image signal with a scan line density suitable for a partner machine, thereby improving communication capability. In addition, no restriction is present as to the scan line density for storage in said storage means.

Furthermore, in a case where said storage means stores a compression encoded image signal, said density conversion means converts the scan line density in the form of an encoded image signal. Therefore, processing associated with the density conversion as well as transmission processing is carried out at a high speed, to thereby shorten the time required for transmission.

The image transmission apparatus of another aspect of the present invention comprises: read-out means for reading an image and converting said image into an image signal; encoding means for compression-encoding said image signal; storage means for storing said encoded image data; transmission means for transmitting said image data; and means for adding fill bits to said image data when transmission by said transmission means is effected. By adding fill bits as a dummy code not when storage by said storage means is effected but when transmission by said transmission means is effected, an effective usage of said storing means is possible. In addition, the amount of fill bits is decided based on the time required for recording at a partner machine, thus improving communication capability for data in said storage means.

The image transmission apparatus of another aspect of the present invention is constructed such that information regarding the sender and transmission time is transmitted in the form of a one-dimensional compression code, in a case where an image is transmitted in the form of a two-dimensional, sequential code. Therefore, even if an error occurs on one line during transmission of such information, the other lines are not adversely affected. In addition, since characters, numerals and the like of such information can be made as small as possible, a space necessary for such information other than image data can be made small.

In the present embodiment, although MH code has been used as an example of a one-dimensional code, a Huffmann code may be used. Also, as a two-dimensional, sequential code, a code in conformity with the READ system or MMR system may be used.

According to an encoding method of one aspect of the present invention, a raw image signal is once converted into an RL signal and thereafter, the RL signal is converted into a two-dimensional compression code. Thus, a very high speed and easy conversion is possible as compared with direct conversion from a raw image signal.

Furthermore, use of an RL signal for selectively effecting one-dimensional and two-dimensional compression encoding enables to facilitate the conversion.

According to the variable length code storing method of another aspect of the present invention, if the number of bits of a variable code excesses the residual number of bits obtained by subtraction of a certain number of bits by the specific number of bits indicating code length data, the variable length code excepting fixed data thereof is allocated to the residual number of bits.

With the arrangement as above, it is possible to store the variable length code and its code length data within the certain number of bits. Since data not stored is fixed data, it can be reproduced based on code length data, thus avoiding a possible error in code conversion. As a result, code conversion under CPU as well as storage into a memory becomes very easy, thereby resulting in improvement of processing speed of encoding or decoding and avoiding waist in use of the memory.

The present invention is not intended to be limited to the above embodiment, but various applications and modifications are possible within the scope of the appended claims.

What is claimed is:

1. An image transmission apparatus comprising:
storage means for storing an image signal;
conversion means for converting a number of dots in one line represented by the image signal in said storage means;
reception means for receiving an identification signal from a reception side, the identification signal representing a type of machine on the reception side; and
transmission means for selectively transmitting the image signal converted by said conversion means or the image signal stored in said storage means,
wherein said transmission means selects the image signal converted by said conversion means or the image signal stored in said storage means in response to the identification signal.

2. An image transmission apparatus according to claim 1, wherein said storage means stores a compression-encoded image signal, and said conversion means operates without converting the compression-encoded signal into an original raw image signal.

3. An image transmission apparatus comprising:
storage means for storing an image signal;
conversion means for converting a scan line density of an image represented by the image signal stored in said storage means;
reception means for receiving an identification signal from a reception side, the identification signal representing a type of machine on the reception side; and
transmission means for selectively transmitting the image signal converted by said conversion means or the image signal stored in said storage means
wherein said transmission means selects the image signal converted by said conversion means or the image signal stored in said storage means in response to the identification signal.

4. An image transmission apparatus according to claim 3, wherein said storage means stores a compression-encoded image signal, and said conversion means converts the scan line density by converting the encoded image signal.

5. An image transmission apparatus comprising:
storage means for storing an image signal;
first conversion means for converting a number of dots in one line represented by the image signal in said storage means;
second conversion means for converting a scan line density of the image signal in said storage means;
reception means for receiving an identification signal from a reception side, the identification signal representing a type of machine on the reception side; and
transmission means for transmitting the image signal stored in said storage means selectively using said first and second conversion means depending on the identification signal.

6. An image transmission apparatus according to claim 5, wherein said storage means stores a compression-encoded image signal, and said first conversion means operates without converting the compression-encoded signal into an original raw image signal.

7. An image transmission apparatus according to claim 5, wherein said storage means stores a compression-encoded image signal, and said second conversion means converts the scan line density by converting the compression-encoded image signal.

8. An image transmission apparatus comprising:
generation means for generating line by line image signal representing an image;
encoding means for compression-encoding the image signals to provide image codes;
storage means for storing the provided image codes with specific codes, the specific codes representing line ends;

addition means for adding dummy data to the image codes read out from said storage means in accordance with the specific codes read out from said storage means; and transmission means for transmitting the image codes and the specific codes both read out from said storage means with the added dummy data.

9. An image transmission apparatus according to claim 8, wherein said storage means stores image data corresponding to one or more lines.

10. An apparatus according to claim 23, further comprising pixel density converting means for converting the scan-line density of image signals represented by the compression encoded image signals.

11. An apparatus according to claim 10, wherein said storage means comprises a first storage arrangement and a second storage arrangement, said scan-line density converting means being arranged to convert the scan-line density of image signals stored in said first storage arrangement and supply the converted signals to said second storage arrangement for storage therein.

12. An apparatus according to claim 11, wherein said encode means is arranged to supply the image codes to both said first and said second storage arrangements.

13. An apparatus according to claim 11, wherein said addition means is coupled to said second storage arrangement to receive the image codes therefrom.

14. An apparatus according to claim 8, further comprising pixel density converting means for converting pixel density per scan-line of the compression encoded image signals.

15. An apparatus according to claim 14, wherein the compression encoding is Modified Huffman coding.

16. An apparatus according to claim 15, wherein said pixel density converting means comprise means for converting the stored Modified Huffman encoded image signals to run length encoded signals, and means for converting pixel density of the run length encoded signals.

17. An apparatus according to claim 16, further comprising an encoder for encoding the pixel density converted run-length encoded signals to Modified Huffman encoded signals.

18. An apparatus according to claim 17, wherein said storage means comprises a first storage arrangement and a second storage arrangement, said pixel density converting means and said encoder being arranged to convert pixel density of lines of image signals stored in said first storage arrangement and supply the converted signals to said second storage arrangement for storage therein.

19. An image transmission apparatus comprising:
read-out means for reading an image and converting the image into an image signal;
storage means for temporarily storing the image signal;
means for encoding the image signal stored in said storing means, to produce an encoded signal; and
means for transmitting the image signal or the encoded signal, wherein a form of storage of the image signal in said storage means differs depending on whether said encoding means is used or not.

20. An image transmission apparatus according to claim 19, wherein, in a case of using said encoding means, said storage means stores RL code.

21. An image transmission apparatus comprising:
encoding means for two-dimensionally encoding an image signal;
means for generating data regarding a sender and transmission time, the data being included in the image signal; and
means for transmitting an image as a two-dimensional code and the data as a one-dimensional code.

22. An image transmission apparatus according to claim 21, wherein said two-dimensional code is an MR code, and said one-dimensional code is an MH code.

23. An image processing method comprising the steps of:
obtaining an original image signal;
compressing and encoding the original image signal to obtain a first code signal representing a run length of the original image signal;
storing the first code signal in an image memory;
discriminating a recording mode on a reception side, in response to information from the reception side;
converting the first code signal read out of the image memory, according to the discriminated recording mode;
encoding the converted first code signal into a second code signal having a form which is different from a form of the first code signal; and
transmitting the second code signal to the reception side.

24. An image processing method according to claim 23, wherein, in said converting step, the run length is converted in accordance with the recording mode.

25. An image processing method according to claim 23, wherein the first code signal and the second code signal include a two-dimensional compression code signal.

26. An image processing method according to claim 25, wherein the first code signal includes a run length code signal and the second code signal includes a Modified READ code signal.

27. An image processing method according to claim 23, wherein the operation in said converting step is selectively inhibited in accordance with the recording mode.

28. An image processing method according to claim 23, wherein the recording mode includes a mode referring to a recording resolution.

29. A data transmission apparatus comprising:
means for generating transmission data;
timer means for generating time data;
memory means for storing the transmission data and for storing the time data generated by said timer means, the time data representing a time at which the transmission data is stored in said memory means;
transmission means for transmitting the transmission data to a reception side; and
reproduction means for reproducing the transmission data a transmission side,
wherein the time data stored in said memory means is reproduced at the transmission side, and
wherein, when said transmission means transmits the transmission data, actual transmission time data generated by said timer means is transmitted together with the transmission data.

30. A data transmission apparatus according to claim 29, in a case that the transmission data is reproduced, the time data in said memory means is reproduced.

31. A data transmission apparatus according to claim 29, wherein said memory means is a single memory.

32. A data transmission apparatus according to claim 29, wherein said transmission data generation means reads an original image and generates an image signal.

* * * * *

UNITED STATES PATENT AND TRADEMARK OFFICE
CERTIFICATE OF CORRECTION

PATENT NO. : 4,845,569

DATED : July 4, 1989

INVENTOR(S) : SADASUKE KURAHAYASHI ET AL.

It is certified that error appears in the above-identified patent and that said Letters Patent is hereby corrected as shown below:

COLUMN 5

Line 52, "Sine" should read --Since--.

COLUMN 7

Line 37, "even" should read --even if--.
　　　Line 65, ""01"." should read --"01")--.

COLUMN 9

Line 33, "on line" should read --one line--.

COLUMN 10

Line 68, "the" should read --the line memory and--.

COLUMN 11

Line 26, "SP14 and SP15" should read
　　　　　　　--SP13, SP14 and SP15--.

COLUMN 13

Line 19, "8/9600=0.83X10-3 sec," should read
　　　　　　　--8/9600=0.83X10$^{-3}$ sec,--.
　　　Line 39, "C data" should read -CG data--.

UNITED STATES PATENT AND TRADEMARK OFFICE
CERTIFICATE OF CORRECTION

PATENT NO. : 4,845,569

DATED : July 4, 1989

INVENTOR(S) : SADASUKE KURAHAYASHI ET AL.

It is certified that error appears in the above-identified patent and that said Letters Patent is hereby corrected as shown below:

COLUMM 14

Line 21, "fiee mode" should read --fine mode--.

COLUMN 15

Line 38, "Mod" should read --Mode--.

COLUMN 16

Line 43, "RAM 23" should read --MPU 23--.

COLUMN 20

Line 26, "means" should read --means,--.

COLUMN 21

Line 11, "claim 23," should read --claim 8,--.
    Line 35, "comprise" should read --comprises--.

UNITED STATES PATENT AND TRADEMARK OFFICE
CERTIFICATE OF CORRECTION

PATENT NO. : 4,845,569

DATED : July 4, 1989

INVENTOR(S) : SADASUKE KURAHAYASHI ET AL.

It is certified that error appears in the above-identified patent and that said Letters Patent is hereby corrected as shown below:

COLUMN 22

Line 53, "data a" should read --data at a--.
Line 61, "29, in" should read --29, wherein, in--.

Signed and Sealed this

Eighteenth Day of December, 1990

Attest:

HARRY F. MANBECK, JR.

*Attesting Officer*       *Commissioner of Patents and Trademarks*